United States Patent
Uemura et al.

(10) Patent No.: US 11,044,646 B2
(45) Date of Patent: Jun. 22, 2021

(54) TERMINAL APPARATUS, BASE STATION APPARATUS, COMMUNICATION SYSTEM, COMMUNICATION METHOD, AND INTEGRATED CIRCUIT

(71) Applicant: Sharp Kabushiki Kaisha, Sakai (JP)

(72) Inventors: Katsunari Uemura, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/327,427

(22) PCT Filed: Jul. 21, 2015

(86) PCT No.: PCT/JP2015/070661
§ 371 (c)(1),
(2) Date: Jan. 19, 2017

(87) PCT Pub. No.: WO2016/013538
PCT Pub. Date: Jan. 28, 2016

(65) Prior Publication Data
US 2017/0164249 A1    Jun. 8, 2017

(30) Foreign Application Priority Data

Jul. 22, 2014   (JP) .............. JP2014-148399

(51) Int. Cl.
*H04W 36/00* (2009.01)
*H04W 72/02* (2009.01)
(Continued)

(52) U.S. Cl.
CPC ... *H04W 36/0072* (2013.01); *H04W 36/0061* (2013.01); *H04W 36/36* (2013.01);
(Continued)

(58) Field of Classification Search
CPC ... H04W 76/023; H04W 8/005; H04W 24/10; H04W 72/085; H04W 72/02;
(Continued)

(56) References Cited

U.S. PATENT DOCUMENTS

2014/0204847 A1 * 7/2014 Belleschi ............ H04W 76/023 370/329
2014/0376458 A1 * 12/2014 Ryu ..................... H04W 72/085 370/329
(Continued)

FOREIGN PATENT DOCUMENTS

EP    3 169 108 A1    5/2017
WO   2013/055271 A1  4/2013
(Continued)

OTHER PUBLICATIONS

Inter-frequency discovery considerations, Kyocera, 3GPP TSG-RAN WG2 #86, Seoul, Republic of Korea May 19-May 23, 2014, R2-142240.*
(Continued)

*Primary Examiner* — Yuwen Pan
*Assistant Examiner* — Jing Gao
(74) *Attorney, Agent, or Firm* — Keating & Bennett, LLP

(57) ABSTRACT

Provided is a technique related to a terminal apparatus, a base station apparatus, a communication system, a communication method, and an integrated circuit which are capable of efficiently performing device-to-device communication. Based on a measurement result of an inter-frequency neighboring cell that supports the direct communication, a cell selection criterion that is used for cell selection, and system information related to the direct communication, which is acquired from a base station apparatus, a terminal apparatus capable of direct communication with a terminal apparatus performs the direct communication with the inter-frequency
(Continued)

neighboring cell by using a radio resource pool that is indicated with the system information.

7 Claims, 7 Drawing Sheets

(51) Int. Cl.
| | | |
|---|---|---|
| *H04W 92/18* | (2009.01) | |
| *H04W 36/36* | (2009.01) | |
| *H04W 72/04* | (2009.01) | |
| *H04W 72/12* | (2009.01) | |
| *H04W 88/06* | (2009.01) | |

(52) U.S. Cl.
CPC ......... *H04W 72/02* (2013.01); *H04W 72/048* (2013.01); *H04W 72/1215* (2013.01); *H04W 92/18* (2013.01); *H04W 88/06* (2013.01)

(58) Field of Classification Search
CPC ............... H04W 72/082; H04W 24/02; H04W 72/0446; H04W 56/001; H04W 72/04; H04W 72/0413; H04W 88/02; H04W 92/18; H04W 24/08; H04W 72/0406; H04W 36/08; H04W 48/12; H04W 4/008; H04W 76/02; H04W 76/043; H04W 36/0072; H04W 36/0061; H04W 36/36; H04W 72/048; H04W 72/1215
See application file for complete search history.

(56) References Cited

U.S. PATENT DOCUMENTS

| | | | |
|---|---|---|---|
| 2015/0163820 A1 | 6/2015 | Hatakawa et al. | |
| 2015/0195828 A1* | 7/2015 | Fujishiro | H04W 76/14 |
| | | | 370/329 |
| 2015/0382324 A1* | 12/2015 | Sheng | H04W 72/02 |
| | | | 370/329 |
| 2018/0115911 A1* | 4/2018 | Huang | H04W 16/24 |

FOREIGN PATENT DOCUMENTS

| | | | | |
|---|---|---|---|---|
| WO | 2013/177179 A1 | 11/2013 | | |
| WO | WO 2013177179 A1 * | 11/2013 | ........ | H04W 72/0406 |
| WO | 2013/187504 A1 | 12/2013 | | |
| WO | WO 2014063747 A1 * | 5/2014 | .......... | H04W 36/165 |
| WO | 2015/009131 A1 | 1/2015 | | |

OTHER PUBLICATIONS

Official Communication issued in International Patent Application No. PCT/JP2015/070661, dated Oct. 20, 2015.
"3rd Generation Partnership Project; Technical Specification Group Radio Access Network; Study on LTE Device to Device Proximity Services; Radio Aspects (Release 12)", 3GPP TR 36.843 V12.0.1, Mar. 2014, pp. 1-50.
"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.0.0, Mar. 2014, pp. 1-34.
LG Electronics Inc., "Prioritized reselection of D2D supported frequency", 3GPP TSG-RAN WG2 #86, R2-142631, May 19-23, 2014, pp. 1-3.
Kyocera, "Inter-frequency Discovery Considerations"; 3GPP TSG-RAN WG2 #86; R2-142240, May 19-23, 2014; 10 pages.

* cited by examiner

TERMINAL APPARATUS, BASE STATION APPARATUS, COMMUNICATION SYSTEM, COMMUNICATION METHOD, AND INTEGRATED CIRCUIT

TECHNICAL FIELD

The present invention relates to a terminal apparatus, a base station apparatus, a communication system, a communication method, and an integrated circuit which are capable of efficiently performing device-to-device communication.

This application claims priority based on Japanese Patent Application No. 2014-148399 filed in Japan on Jul. 22, 2014, the content of which is incorporated herein.

BACKGROUND ART

In the 3GPP (3rd Generation Partnership Project) which is a standardization project, standardization of EUTRA (Evolved Universal Terrestrial Radio Access) is performed, in which high-speed communication is realized by adopting an OFDM (Orthogonal Frequency-Division Multiplexing) communication scheme and flexible scheduling with a predetermined frequency and time unit called a resource block. The EUTRA is also referred to as LTE (Long Term Evolution) in some cases.

Moreover, in the 3GPP, a discussion on LTE Advanced (also referred to as LTE-A) that realizes higher-speed data transmission and has an upward compatibility with the LTE has been carried out.

In the LTE Advanced, a discussion on a technique by which direct communication is performed between an apparatus (terminal apparatus) and an apparatus (terminal apparatus) has been carried out. The direct communication between an apparatus and an apparatus is referred to as D2D (Device to Device) or device-to-device communication. Note that, D2D which is standardized in the 3GPP is particularly referred to as LTE-D2D or LTE-Direct as well.

A method for discovery of a proximal terminal apparatus for realizing services between terminal apparatuses in proximity to each other (Proximity based Services: ProSe) in the D2D, a method for enabling direct communication between terminal apparatuses, and the like have been discussed in the 3GPP (NPL 1).

Moreover, NPL 2 describes, for example, a method by which, only in a case where a terminal apparatus that is interested to receive an MBMS (Multimedia Broadcast and Multicast Service) service and is in an idle mode camps on a frequency with which services related to the MBMS (MBMS service) is provided and in a case where reception of the services related to the MBMS is allowed, the services related to the MBMS is able to be continued by making priority of the frequency with which the services related to the MBMS is provided the highest in cell re-selection procedure.

In addition, NPL 3 describes, for example, a method by which, by using a technique similar to that of NPL 2, a terminal apparatus that is interested to perform D2D communication and is in an idle mode makes priority of a frequency with which transmission/reception of the D2D is allowed in cell re-selection procedure (frequency with which services of the D2D are able to be provided) the highest and thereby transmission or reception of services related to the D2D becomes possible.

CITATION LIST

Non Patent Document

[NON-PATENT DOCUMENT 1] NPL 1: 3GPP TS 36.843 V12.0.1 (2014 March), http://www.3gpp.org/DynaReport/36843.htm
[NON-PATENT DOCUMENT 2] NPL 2: 3GPP TS 36.304 V12.0.0 (2014 March), http://www.3gpp.org/DynaReport/36304.htm
[NON-PATENT DOCUMENT 3] NPL 3: R2-142631, LG Electronics Inc., Korea, 19-23 May 2014, http://www.3gpp.org/ftp/tsg_ran/WG2_RL2/TSGR2_86/Docs

DISCLOSURE OF THE INVENTION

By using the method of NPL 3, a terminal apparatus that is interested to perform D2D communication and is in the idle mode is able to preferentially select a frequency with which transmission or reception of the D2D is allowed, in the case of being interested to transmit or receive of the services related to the D2D. However, in a case where there are a large number of terminal apparatuses that are interested to perform D2D communication, a problem that the terminal apparatuses concentratedly camp on a frequency (cell), with which the transmission or the reception of the D2D is allowed, and capacity of a base station apparatus of the frequency (cell) is exceeded (overloaded) is caused.

Note that, it may be that a recent terminal apparatus adapted to multiple bands is able to transmit or receive the services related to the D2D in an inter-frequency cell, which supports the D2D, without performing inter-cell movement such as cell re-selection or handover. However, it seems that such a method for supporting the D2D in an inter-frequency cell has not been discussed in detail.

An embodiment of the invention relates to a terminal apparatus capable of efficiently performing device-to-device communication, a base station apparatus, a communication system, a communication method, and an integrated circuit.

A terminal apparatus in one embodiment of the invention is a terminal apparatus capable of direct communication with a terminal apparatus, in which, based on a measurement result of an inter-frequency neighboring cell that supports the direct communication, a cell selection criterion that is used for cell selection, and system information related to the direct communication, which is acquired from a base station apparatus, the direct communication is performed with the inter-frequency neighboring cell by using a radio resource pool that is indicated with the system information.

Moreover, a terminal apparatus in another embodiment of the invention regards the inter-frequency neighboring cell to be in coverage and performs the direct communication by using the radio resource pool that is indicated with the system information, in a case where the measurement result of the inter-frequency neighboring cell satisfies the cell selection criterion.

Moreover, a terminal apparatus in another embodiment of the invention re-acquires the system information in the inter-frequency neighboring cell based on update information of the system information related to the direct communication, which is transmitted in the inter-frequency neighboring cell, in a case where transmission/reception related to the direct communication is performed in the inter-frequency neighboring cell.

Moreover, a base station apparatus in another embodiment of the invention notifies a cell selection criterion that is used for cell selection to a terminal apparatus capable of direct communication with a terminal apparatus, and notifies a radio resource pool of an inter-frequency neighboring cell, which satisfies the cell selection criterion, with system information related to the direct communication.

By using such means, the terminal apparatus becomes able to efficiently perform device-to-device communication.

Moreover, a base station apparatus in another embodiment of the invention notifies a cell selection criterion that is used for cell selection to the terminal apparatus, and notifies a radio resource pool of an inter-frequency neighboring cell, which satisfies the cell selection criterion, with system information related to the direct communication, and a terminal apparatus performs the direct communication with the inter-frequency neighboring cell by using the radio resource pool that is indicated with the system information, based on a measurement result of the inter-frequency neighboring cell, the cell selection criterion, and the system information.

By using such means, the base station apparatus becomes able to efficiently perform device-to-device communication.

Moreover, a communication method in another embodiment of the invention is a communication method of a terminal apparatus capable of direct communication with a terminal apparatus, including the step of, based on a measurement result of an inter-frequency neighboring cell that supports the direct communication, a cell selection criterion that is used for cell selection, and system information related to the direct communication, which is acquired from a base station apparatus, performing the direct communication with the inter-frequency neighboring cell by using a radio resource pool that is indicated with the system information.

By using such means, it becomes possible to efficiently perform device-to-device communication with the communication method including the base station apparatus and the terminal apparatus.

Moreover, a communication method of a terminal apparatus in another embodiment of the invention further includes the steps of regarding the inter-frequency neighboring cell to be in coverage and performing the direct communication by using the radio resource pool that is indicated with the system information, in a case where the measurement result of the inter-frequency neighboring cell satisfies the cell selection criterion.

Moreover, a communication method of a terminal apparatus in another embodiment of the invention further includes the step of re-acquiring the system information in the inter-frequency neighboring cell based on update information of the system information related to the direct communication, which is transmitted in the inter-frequency neighboring cell, in a case where transmission/reception related to the direct communication is performed in the inter-frequency neighboring cell.

By using such means, the terminal apparatus becomes able to include the communication method of efficiently performing device-to-device communication.

Moreover, a communication method of a base station apparatus in another embodiment of the invention includes at least the steps of notifying a cell selection criterion that is used for cell selection to a terminal apparatus capable of direct communication with a terminal apparatus, and notifying a radio resource pool of an inter-frequency neighboring cell, which satisfies the cell selection criterion, with system information related to the direct communication.

By using such means, the base station apparatus becomes able to include the communication method of efficiently performing device-to-device communication.

Moreover, an integrated circuit of a terminal apparatus in another embodiment of the invention causes the terminal apparatus to exert at least a function of, based on a measurement result of an inter-frequency neighboring cell that supports the direct communication, a cell selection criterion that is used for cell selection, and system information related to the direct communication, which is acquired from a base station apparatus, performing the direct communication with the inter-frequency neighboring cell by using a radio resource pool that is indicated with the system information.

Moreover, an integrated circuit of a base station apparatus in another embodiment of the invention causes the base station apparatus to exert at least functions of notifying a cell selection criterion that is used for cell selection to a terminal apparatus capable of direct communication with a terminal apparatus, and notifying a radio resource pool of an inter-frequency neighboring cell, which satisfies the cell selection criterion, with system information related to the direct communication.

By using such means, the integrated circuit of the base station apparatus becomes able to cause the base station apparatus to exert a function of efficiently performing device-to-device communication.

In this specification, although each embodiment is disclosed in terms of a technique related to a terminal apparatus, a base station apparatus, a communication system, a communication method, and an integrated circuit which efficiently perform device-to-device communication, a communication scheme which may be applied to each embodiment is not limited to a communication scheme used for EUTRA (LTE, LTE-A).

For example, the technique described in this specification may be used in various communication systems using code division multiple access (CDMA), time division multiple access (TDMA), frequency division multiple access (FDMA), orthogonal FDMA (OFDMA), single carrier FDMA (SC-FDMA), and other access schemes. In addition, in this specification, a system and a network may be used synonymously.

According to an embodiment of the invention, it is possible to provide a technique related to a terminal apparatus, a base station apparatus, a communication system, a communication method, and an integrated circuit which are capable of efficiently performing device-to-device communication.

MODE FOR CARRYING OUT THE INVENTION

Figure 1:
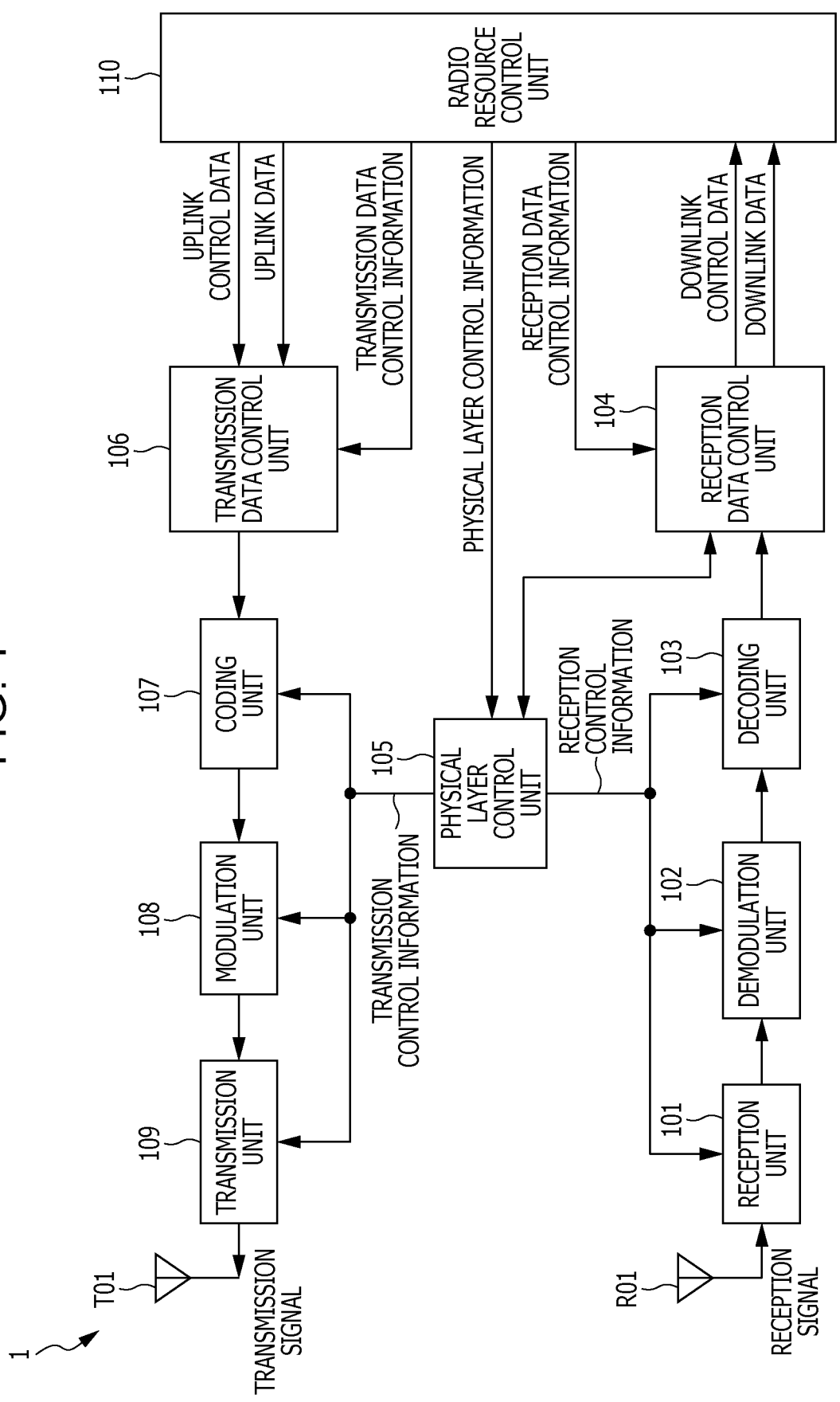
FIG. 1 is a block diagram illustrating an example of a schematic configuration of a terminal apparatus according to an embodiment of the invention.

A technique related to each embodiment of the invention will be briefly described below.
[Physical Channel/Physical Signal]

Description will be given for a physical channel and a physical signal which are primarily used in EUTRA (LTE, LTE-A). A channel means a medium used for transmission/reception of a signal, and a physical channel means a physical medium used for transmission/reception of a signal. In the invention, a physical channel and a signal may be used synonymously. There is a possibility that, in a communication system obtained by developing the EUTRA (LTE, LTE-A), for a physical channel, a channel type is added or a structure or a format style thereof is modified or added, but even in such a case, there is no influence on the description of each embodiment of the invention.

In the EUTRA, scheduling of the physical channel or the physical signal is managed by using a radio frame. One radio frame is 10 ms and one radio frame is configured by ten subframes. Further, one subframe is configured by two slots (that is, one subframe has 1 ms and one slot has 0.5 ms). Moreover, management is performed by using a resource block as a minimum unit of scheduling, in which physical channels are arranged. The resource block is defined by a fixed frequency domain in which a frequency axis is configured by an assembly of a plurality of subcarriers (for example, twelve subcarriers) and a domain configured by a fixed transmission time interval (one slot).

Synchronization signals are configured by three types of primary synchronization signals and secondary synchronization signals which are configured by 31 types of codes which are arranged alternately in a frequency domain, and a combination of signals of the primary synchronization signals and the secondary synchronization signals indicates 504 cell identifiers (physical cell ID (Physical Cell Identity; PCI)), which identify a base station apparatus, and a frame timing for radio synchronization. A terminal apparatus specifies a physical cell ID of synchronization signals received by cell search.

A physical broadcast channel (PBCH) is transmitted for the purpose of notifying (configuring) master control information which is commonly used in terminal apparatuses in a cell. A base station apparatus notifies (transmits) a master information block (MIB) message by the physical broadcast channel Information notified (configured) by the master information block message to a terminal apparatus is configuration information of the physical channel (PHICH) related to a downlink frequency bandwidth, a system frame number, and Hybrid ARQ.

The base station apparatus transmits, to the terminal apparatuses, cell common information (broadcast information) excluding the master information block by using a system information block type 1 (SIB 1) message in which a subframe position and a period are statically defined (pre-defined), and a system information message which is a layer 3 message (RRC message) and in which scheduling is performed dynamically in a system information window (SI-window) designated by the system information block type 1.

The system information message is notified by using a physical downlink shared channel in a radio resource indicated by a physical downlink control channel, and transmits one piece of broadcast information (system information block type 2 to type n (SIB 2 to SIB n (n is a natural number))), which is classified in accordance with intended uses thereof, in a corresponding system information window.

As the broadcast information, a cell global identifier (CGI) indicating an identifier of an individual cell, a tracking area identifier (TAI) for managing a standby area by paging, random access configuration information, timing adjustment information, shared radio resource configuration information of each cell, intra-frequency (inter-frequency, inter-RAT) neighboring cell information (Neighboring cell list), uplink access restriction information or the like is notified.

Downlink reference signals are classified into a plurality of types in accordance with intended use thereof. For example, cell-specific RSs (Cell-specific reference signals) are pilot signals which are transmitted with predetermined power for each cell, and are downlink reference signals which are iterated periodically in a frequency domain and a time domain based on a predetermined rule. The terminal apparatus measures reception quality of each cell by receiving the cell-specific RSs. Moreover, the terminal apparatus uses the cell-specific RSs also as reference signals for demodulation of the physical downlink control channel or the physical downlink shared channel, which is transmitted at the same time with the cell-specific RSs. As a sequence used for the cell-specific RSs, a sequence which is identifiable for each cell is used.

The downlink reference signals are used also for estimation of channel fluctuation of the downlink. The downlink reference signals used for the estimation of channel fluctuation are referred to as channel state information reference signals (CSI-RSs). The downlink reference signals which are configured individually to the terminal apparatus are referred to as UE specific reference signals (URSs), or demodulation reference signals (DMRSs), and referred to for channel compensation processing of a channel when the physical downlink control channel, an enhanced physical downlink control channel, or the physical downlink shared channel is demodulated.

The physical downlink control channel (PDCCH) is transmitted in several OFDM symbols (for example, 1 to 4 OFDM symbols) from beginning of each subframe. The enhanced physical downlink control channel (EPDCCH) is a physical downlink control channel which is arranged in an OFDM symbol in which the physical downlink shared channel PDSCH is arranged. The PDCCH or the EPDCCH is used for the purpose of notifying the terminal apparatus of radio resource assignment information according to scheduling of the base station apparatus and control information for giving instruction of an adjustment amount of increase or decrease in transmit power. Hereinafter, when simply described as the physical downlink control channel (PDCCH), it means both physical channels of the PDCCH and the EPDCCH unless otherwise specified.

The terminal apparatus needs to acquire radio resource assignment information called uplink grant in the case of transmission and downlink grant (downlink assignment) in the case of reception from the physical downlink control channel by monitoring the physical downlink control channel addressed to the terminal apparatus before transmitting or receiving a layer 2 message (MAC-CE) and a layer 3 message (paging, system information, and the like) and by receiving the physical downlink control channel addressed to the terminal apparatus. In the case of supporting D2D, the physical downlink control channel is able to notify D2D grant. Note that, the physical downlink control channel may be configured so as to be, other than to be transmitted in the OFDM symbols described above, transmitted in a domain of a resource block assigned from the base station apparatus to the terminal apparatus in an individual (dedicated) manner.

A physical uplink control channel (PUCCH) is used for performing a reception confirmation response (ACK/NACK: Acknowledgement/Negative Acknowledgement) of downlink data transmitted on the physical downlink shared channel, channel (channel state) information (CSI: Channel State Information) of the downlink, and a radio resource assignment request (radio resource request, scheduling request (SR)) of the uplink.

CSI includes a CQI (Channel Quality Indicator), a PMI (Precoding Matrix Indicator), a PTI (Precoding Type Indicator), and an RI (Rank Indicator). Each indicator may be described as indication.

The physical downlink shared channel (PDSCH) is used also for notifying the terminal apparatus of, in addition to the downlink data, the layer 3 message such as paging and system information. Radio resource assignment information of the physical downlink shared channel is indicated (notified) by the physical downlink control channel. The physical downlink shared channel is arranged and transmitted in the OFDM symbol other than the OFDM symbols in which the physical downlink control channel is transmitted. That is, the physical downlink shared channel and the physical downlink control channel are subjected to time division multiplexing in one subframe.

A physical uplink shared channel (PUSCH) mainly transmits uplink data and uplink control data, and may include control data such as CSI or ACK/NACK. Moreover, it is used also for notifying the base station apparatus of uplink control information, in addition to the uplink data, as the layer 2 message and the layer 3 message from the terminal apparatus. Similarly to the downlink, radio resource assignment information of the physical uplink shared channel is indicated by the physical downlink control channel.

An uplink reference signal (also referred to as an uplink pilot signal or an uplink pilot channel) includes a demodulation reference signal (DMRS) which is used by the base station apparatus for demodulating the physical uplink control channel PUCCH and/or the physical uplink shared channel PUSCH, and a sounding reference signal (SRS) which is used by the base station apparatus mainly for estimating a channel state of the uplink. As the sounding reference signal, there are a periodic sounding reference signal (Periodic SRS) which is transmitted periodically and an aperiodic sounding reference signal (Aperiodic SRS) which is transmitted when an instruction is given from the base station apparatus.

A physical random access channel (PRACH) is a channel which is used for notifying (configuring) a preamble sequence and has a guard time. The preamble sequence is configured so as to notify the base station apparatus of information by a plurality of sequences. For example, when 64 types of sequences are prepared, it is possible to indicate 6-bit information to the base station apparatus. The physical random access channel is used as access means of the terminal apparatus to the base station apparatus.

The terminal apparatus uses the physical random access channel, for example, for making a radio resource request of the uplink when the physical uplink control channel is not configured, or requesting, to the base station apparatus, timing adjustment information (also called timing advance (TA)) which is required for aligning an uplink transmission timing to a reception timing window of the base station apparatus. Moreover, the base station apparatus may also request the terminal apparatus to initiate random access procedure by using the physical downlink control channel Note that, in the case of the D2D, adjustment of a transmission timing is performed by using the TA also for transmission to another terminal apparatus. The TA (first timing adjustment information) for the base station apparatus and the TA (D2D-TA (second timing adjustment information)) related to the D2D may be the same or may be different.

The D2D-TA may be notified with the same value in a cell by the broadcast information, or may be notified individually from the base station apparatus to the terminal apparatus. Moreover, similarly to the TA, the D2D-TA may be configured so as to have a timing (value) adjusted by a signal (for example, a MAC control element or the like) from the base station apparatus.

The layer 3 message is a message handled by a protocol of a control-plane (CP (C-Plane)) which is exchanged between RRC (radio resource control) layers of the terminal apparatus and the base station apparatus, and may be used synonymously with RRC signaling or an RRC message. Note that, against the control-plane, a protocol handling user data is referred to as a user-plane (UP (U-Plane)).

Using a D2D synchronization signal (D2DSS), a physical D2D synchronization channel (PD2DSCH), or the like as a physical channel related to the D2D has been examined. The D2D synchronization signal is configured by two synchronization signals of a PD2DSS (Primary D2DSS) and an SD2DSS (Secondary D2DSS).

Moreover, it has been considered that the physical D2D synchronization channel is transmitted from a terminal apparatus which transmits the D2D, and transmitted for the purpose of notifying control information (for example, a synchronization ID related to the transmitting terminal apparatus, a resource pool, a system bandwidth, TDD subframe configuration, and the like) related to the D2D, a D2D frame number, etc.

In addition, it has been considered that the terminal apparatus which transmits the D2D transmits scheduling assignments (SA) to a terminal apparatus which receives the D2D. The SA is able to explicitly or implicitly notify timing adjustment information related to transmission data related to D2D (D2D Reception Timing Advance (D2D-TA)), ID information with which a content (type) of the D2D is identified, radio resource patterns of the transmission data (RPT; Resource Patterns for Transmission) corresponding to the ID information, and the like.

The terminal apparatus which has received the SA is able to perform reception by adjusting a reception timing of the transmission data related to D2D based on a timing acquired from the D2D synchronization signal and the timing adjustment information included in the SA. Note that, the timing adjustment information of the transmission data related to D2D may be transmitted by the PD2DSCH.

Information of the transmission data related to D2D, which is indicated by the RPT, includes bandwidth information, resource information of a frequency domain, frequency hopping information, resource information of a time domain, and the like. The terminal apparatus which transmits the D2D may use the PUSCH as a physical channel by which the SA and the transmission data related to D2D are notified, or may assign a dedicated physical channel to each of them. In the case of using the PUSCH, the terminal apparatus which receives the D2D needs to receive the PUSCH with a corresponding frequency and perform decoding.

Note that, since a physical channel and a physical signal other than the above are not involved much in each embodiment of the invention, detailed description thereof will be omitted. Examples of the physical channel or the physical signal whose description will be omitted include a physical control format indicator channel (PCFICH), a physical HARQ indicator channel (PHICH: Physical Hybrid ARQ Indicator CHannel), a physical multicast channel (PMCH), and the like.

[Radio Network and Cell Type]

A communication available range (communication area) of each frequency which is controlled by the base station apparatus is regarded as a cell. In this case, respective communication areas covered by the base station apparatus may have different areas and different shapes for each frequency. Moreover, areas which are covered may be different for each frequency. A radio network in which cells which are different in types of base station apparatuses and sizes of cell radii are mixed in areas with the same frequency or different frequencies to form one communication system is referred to as a heterogeneous network.

The terminal apparatus may regard, as a suitable cell, a cell to which access of the terminal apparatus is determined not to be prohibited based on broadcast information notified from the base station apparatus and in which reception quality of the downlink fulfills a designated condition and, as a result thereof, normal services are permitted when the terminal apparatus camps thereon. When the terminal apparatus moves from the cell camped on to another cell, the movement is performed by cell re-selection procedure in a non-radio resource control connection state (in an idle mode or a non-communication state), or by handover procedure at a time of a radio resource control connection (in a connected mode or a communication state).

The terminal apparatus may regard a cell, which is not determined as a suitable cell by cell selection (cell re-selection) procedure, as a cell (limit cell) in which only a part of services is permitted. Note that, the terminal apparatus is able to camp on even the limit cell. Examples of the part of the services include emergency call. In a state of camping on a cell (idle mode) or in the connected mode with a certain cell, the terminal apparatus may be judged to be positioned in an area in which communication with the base station apparatus is allowed, that is, in a service region of the cell (in-coverage).

The base station apparatus manages one or more cells for each frequency. One base station apparatus may manage a plurality of cells. Cells are classified into a plurality of types in accordance with sizes of areas (cell sizes) in which communication is allowed with the terminal apparatus. For example, cells are classified into macro cells and small cells. A small cell is a cell which generally covers from several meters to several tens of meters of a radius. Further, the small cells are classified into femto cells, pico cells, nano cells, and the like in accordance with sizes of areas thereof in some cases.

When the terminal apparatus is able to communicate with a certain base station apparatus, a cell which is used for communication with the terminal apparatus is a serving cell and other cells which are not used for the communication are referred to as neighboring cells among cells of the base station apparatus.

A frequency of the serving cell is also referred to as the same frequency (Intra-frequency) or a serving frequency. A frequency which is not the same frequency is referred to as a different frequency (Inter-frequency). In a case where a plurality of serving cells are configured with respect to the terminal apparatus by carrier aggregation or the like, it is regarded that there are a plurality of corresponding serving frequencies.

[Carrier Aggregation]

A technique (carrier aggregation) of aggregating frequencies (component carriers or frequency bands) of a plurality of different frequency bands and dealing with them as one frequency (frequency band) may be applied to the terminal apparatus and the base station apparatus. In the carrier aggregation, as the component carriers, there are an uplink component carrier corresponding to the uplink and a downlink component carrier corresponding to the downlink. In this specification, a frequency and a frequency band may be used synonymously. Note that, the carrier aggregation is communication by a plurality of serving cells by using a plurality of component carriers (frequency bands), and is also referred to as cell aggregation.

For example, in a case where five component carriers each having a frequency bandwidth of 20 MHz are aggregated by the carrier aggregation, a terminal apparatus having capability which allows the carrier aggregation performs transmission/reception by regarding the aggregated component carriers to have a frequency bandwidth of 100 MHz. Note that, the component carriers to be aggregated may be contiguous frequencies or frequencies the entirety or a part of which is non-contiguous. For example, in a case where available frequency bands are an 800 MHz band, a 2 GHz band, and a 3.5 GHz band, a certain component carrier may be transmitted in the 800 MHz band, another component carrier may be transmitted in the 2 GHz band, and still another component carrier may be transmitted in the 3.5 GHz band.

It is also possible to aggregate a plurality of contiguous or non-contiguous component carriers in the same frequency band. The frequency bandwidth of each component carrier may be a frequency bandwidth (for example, 5 MHz or 10 MHz) which is narrower than a receivable frequency bandwidth (for example, 20 MHz) of the terminal apparatus, and respective frequency bandwidths for aggregation may be different from each other. It is desired that the frequency bandwidth is equal to any conventional frequency bandwidth of a cell by considering backward compatibility, but may have a frequency bandwidth different from the conventional frequency bandwidth of a cell.

The terminal apparatus and the base station apparatus manage a cell that is constituted by a certain uplink component carrier and a downlink component carrier, which is connected to this uplink component carrier in a cell-specific manner, as a primary cell (PCell). In addition, the terminal apparatus and the base station apparatus manage a cell that is constituted by a component carrier other than the primary cell as a secondary cell (SCell). A frequency of the primary cell is referred to as a primary frequency and a frequency of the secondary cell is referred to as a secondary frequency.

The terminal apparatus performs reception of a paging message, detection of update of broadcast information, random access procedure, configuration of security information, and the like in the primary cell, but they may not be performed in the secondary cell. The primary cell and the secondary cell are collectively referred to as serving cells.

That is, in a case where a plurality of component carriers (cells) are aggregated, the terminal apparatus is to have a plurality of serving cells.

With regard to a state of the serving cell, a state of being activated and a state of being deactivated are also referred to as an activated state and a deactivated state, respectively. Although the primary cell is out of the target of control of activation and deactivation (that is, the primary cell is always regarded as being activated), the secondary cell has the states of the cell as activation and deactivation according to activity.

In addition, a special secondary cell, for example, which is configured so as to be able to realize a part of functions of the primary cell is also referred to as a primary secondary cell (Primary SCell (PSCell). For example, similarly to the primary cell, the primary secondary cell is a cell which is not deactivated and for which the physical uplink control channel is configured and contention based random access procedure is executed. Note that, the primary secondary cell is regarded as being the serving cell similarly to the primary cell and the secondary cell.

For the state of the serving cell, a change of the state may be explicitly designated (notified, instructed) from the base station apparatus in some cases, or the state may be changed based on timer information (deactivation timer) counting the time by the terminal apparatus for each component carrier (cell) in other cases.

[D2D]

A basic technology of D2D will be described briefly.

The D2D is classified into at least a technique for discovering a proximal terminal apparatus (discovery) and a technique by which a terminal apparatus performs direct communication with one or more terminal apparatuses (direct communication (also referred to as communication)).

In the D2D, a resource (radio resource) and a configuration which are related to the D2D and used by the terminal apparatus may be configured (controlled) by the base station apparatus. That is, in a case where the terminal apparatus is in the non-radio resource control connection state (idle mode), the radio resource and the configuration related to the D2D may be notified for each cell with broadcast information, and in a case where the terminal apparatus is in a radio resource control connection state (connected mode), the radio resource and the configuration related to the D2D may be notified with an RRC message.

That is, the D2D may possibly be realized by terminal apparatuses which are capable of direct communication between terminal apparatuses (D2D capable, D2D supported) and a base station apparatus which is capable of controlling a resource for direct communication between the terminal apparatuses. Alternatively, the D2D may possibly be realized by pre-configuration of the terminal apparatuses which are capable of direct communication between terminal apparatuses.

Moreover, in the direct communication, a radio resource by which scheduling assignments (SA) are transmitted is provided to the terminal apparatus from a resource pool (SA resource pool) which pools for the SA. A terminal apparatus which transmits the D2D transmits the SA with the radio resource (a time and a frequency) which is included in the resource pool. A terminal apparatus which receives the D2D receives the SA with the radio resource (the time and the frequency) which is included in the resource pool.

In addition, in the direct communication, a radio resource by which transmission data related to D2D is transmitted is provided to the terminal apparatus from a resource pool (D2D data resource pool) which pools for the transmission data related to D2D (D2D data). The terminal apparatus which transmits the D2D transmits the transmission data related to D2D by using the radio resource (a time and a frequency) which is designated from the resource pool. The terminal apparatus which receives the D2D receives the transmission data related to D2D by using the radio resource (the time and the frequency) which is designated from the resource pool. The resource pool may be indicated with frequency information, information which indicates a range of a resource block to be assigned, information of a frame number or a subframe number at which the resource pool is started and an offset value, or the like.

In this case, the resource pool (first resource pool) in which the radio resource to be used for the SA is pooled and the resource pool (second resource pool) in which the radio resource to be used for the transmission data related to D2D may be configured in advance (reserved) with broadcast information, individually notified (broadcasted) from the base station apparatus to each terminal apparatus, notified (broadcasted) from another terminal apparatus, pre-configured, or assigned in a semi-static manner.

In a case where the assignment is performed by pre-configuration, the configuration may be typically recorded in a SIM (Subscriber Identity Module). The SIM may be an IC card provided by hardware, or may be provided by software.

Here, as a method of assigning the radio resource related to D2D (SA, transmission data related to D2D) from the resource pool to the terminal apparatus, a method (also referred to as Mode 1 or a scheduled method) in which the terminal apparatus notifies, to the base station apparatus, that there is transmission data related to D2D and thereby the radio resource is individually assigned from the base station apparatus to the terminal apparatus may be used, or a method (also referred to as Mode 2 or an autonomous method) in which the terminal apparatus selects the radio resource from the broadcast information or the resource pool, which is configured in advance (reserved), in accordance with a certain regulation (or in a random manner) for use may be used.

Mode 1 is used when the terminal apparatus is positioned in a range regarded as being in coverage of the base station apparatus, and Mode 2 is used when the terminal apparatus is not positioned in the range regarded as being in the coverage of the base station apparatus (out-of-coverage), both of which are modes of the direct communication. Note that, even when the radio resource assigned from the base station apparatus is used (that is, Mode 1), in RRC radio resource re-connection procedure, the terminal apparatus temporarily uses the radio resource selected by the terminal apparatus (that is, Mode 2) in some cases.

Figure 7:
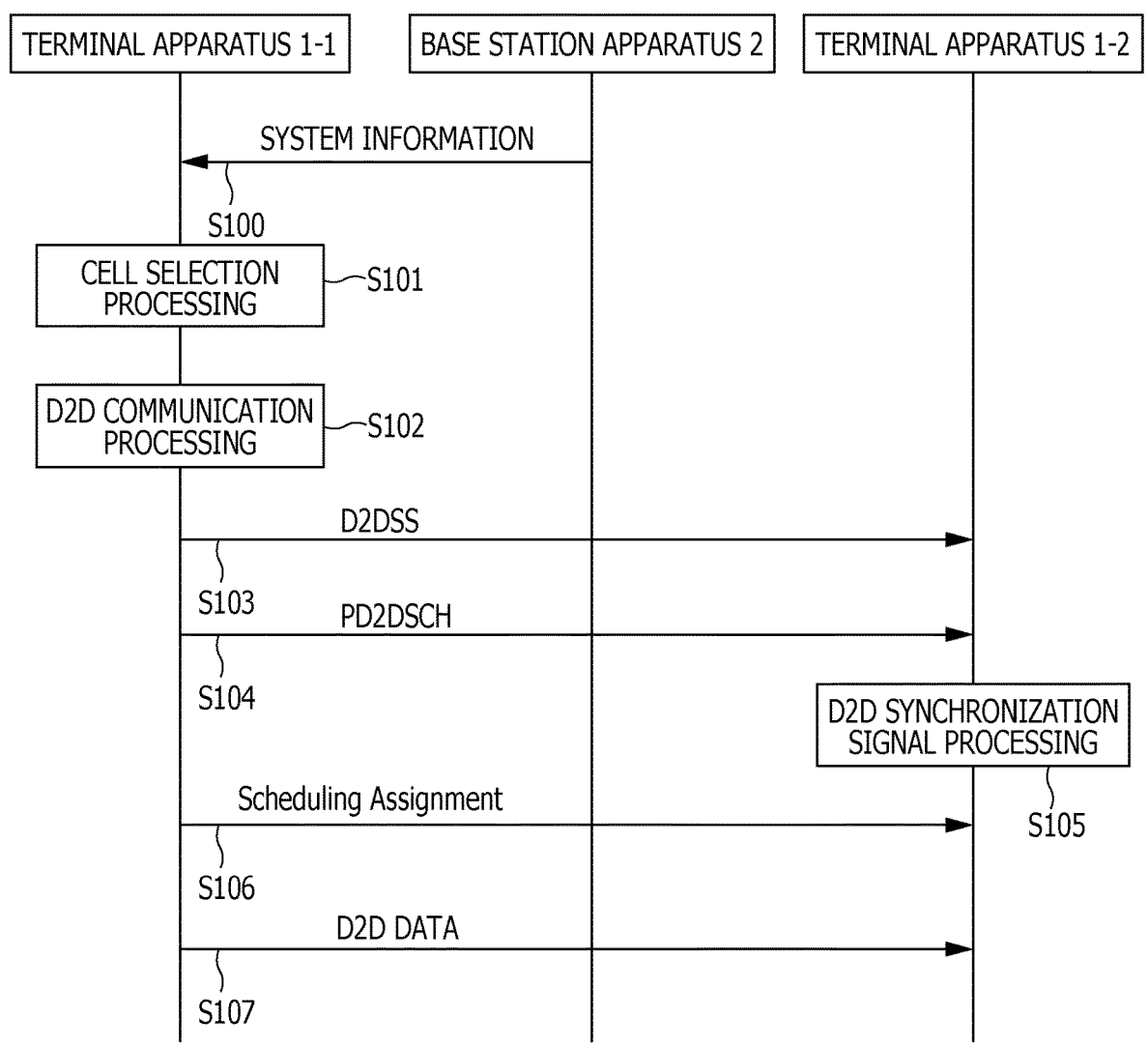
FIG. 7 is a flowchart illustrating an example of a case where a terminal apparatus which transmits D2D and a terminal apparatus which receives the D2D perform communication of the D2D.

FIG. 7 is a flowchart illustrating an example of a case where a terminal apparatus 1-1 (D2D transmission UE) which transmits D2D and a terminal apparatus 1-2 (D2D reception UE) which receives the D2D perform communication of D2D.

In FIG. 7, first, the terminal apparatus 1-1 receives a system information message which is an RRC message when camping on a cell of a base station apparatus 2 (step S100). The system information message is used for the purpose of notifying the terminal apparatus 1-1 and the terminal apparatus 1-2 of configuration information related to D2D (for example, D2DSS configuration information, PD2DSCH configuration information, D2D information of a neighboring cell, resource pool information for SA, resource pool information for transmission data related to D2D, permission information of Mode 1/Mode 2, or the like). Such information may be transmitted from the base station apparatus 2 by a certain independent system information block (for example, SIB 18), or may be transmitted by an individual RRC message in a case where the terminal apparatus 1-1 (terminal apparatus 1-2) is in a communication state.

Next, in the case of being interested to perform D2D communication, the terminal apparatus 1-1 performs cell selection processing based on information of the received system information message (step S101). In the cell selection processing, in accordance with broadcast information which indicates whether the D2D is supported by an uplink band with which an RF (Radio Frequency) circuit of the terminal apparatus 1-1 is compatible, the terminal apparatus 1-1 changes the camped cell when necessary.

The terminal apparatus 1-2 also executes step S101 similarly. That is, in the case of being interested to perform D2D communication, based on information of the received system information message, the terminal apparatus 1-2 performs cell selection processing as necessary in accordance with broadcast information which indicates whether the D2D is supported by an uplink frequency (frequency band) with which an RF (Radio Frequency) circuit of the terminal apparatus 1-2 is compatible.

Thereafter, the terminal apparatus 1-1 starts communication processing of the D2D (step S102). More specifically, the terminal apparatus 1-1 determines transmission codes and data of a D2DSS and a PD2DSCH, and selects a radio resource related to D2D from a resource pool which is usable for the terminal apparatus 1-1 in an idle mode (that is, a resource pool which is able to be selected by the terminal apparatus 1-1 in the idle mode).

Note that, in a case where D2D in Mode 2 is not permitted in the base station apparatus 2, the terminal apparatus 1-1 starts radio resource control connection establishment (RRC connection establishment) procedure with respect to the base station apparatus 2 in order to perform D2D in Mode 1, and starts the D2D in a connected mode, but it is omitted in the figure.

The terminal apparatus 1-1 performs transmission of the D2DSS (step S103) and transmission of the PD2DSCH (step S104) with an uplink band (uplink frequency) by which the D2D is able to be transmitted. Note that, the PD2DSCH is not transmitted in some cases. In the case of receiving (detecting) the D2DSS (PD2DSCH), which has been transmitted by the terminal apparatus 1-1, in D2D synchronization signal processing at step S105, the terminal apparatus 1-2 detects existence of the terminal apparatus 1-1 (discovery), and establishes (adjusts) radio synchronization related to D2D in order to receive transmission data related to D2D, which is from the terminal apparatus 1-1.

Moreover, the terminal apparatus 1-1 selects a resource for SA from a resource indicated by the resource pool information for SA, and transmits SA to the terminal apparatus 1-2 by using the selected resource (step S106). Note that, in the case of Mode 1, the resource for SA to be used by the terminal apparatus 1-1 is instructed from the base station apparatus 2 by using D2D grant. Further, the terminal apparatus 1-1 selects a resource for transmission data from the resource pool information for transmission data based on the selected (or notified) SA, and transmits data related to D2D to the terminal apparatus 1-2 by using the selected resource (step S107).

The terminal apparatus 1-2 receives (monitors) the SA, which has been transmitted by the terminal apparatus 1-1, in the resource indicated with the resource pool information for SA. Moreover, the terminal apparatus 1-2 receives (monitors) the data related to D2D, which has been transmitted by the terminal apparatus 1-1, in the resource which is in the resource pool information for transmission data and indicated by the SA. With regard to a timing of receiving (monitoring) the data related to D2D, a position, at which timing adjustment by TA related to D2D (D2D-TA) is performed for a timing at which the terminal apparatus 1-2 has received the SA, may be used as a reception timing. The D2D-TA may be applied only in the case of D2D in Mode 1.

Description will hereinafter be given in detail for appropriate embodiments of the invention with reference to accompanying drawings while considering above matters. Note that, in the description of the embodiments of the invention, when it is judged that specific description of known functions or configurations related to the embodiments of the invention makes the subject matter of the embodiments of the invention unclear, the detailed description thereof will be omitted.

<First Embodiment>

A first embodiment of the invention will be described below.

FIG. 1 is a block diagram illustrating an example of a terminal apparatus 1 in the first embodiment of the invention. The terminal apparatus 1 is composed of at least a reception unit 101, a demodulation unit 102, a decoding unit 103, a reception data control unit 104, a physical layer control unit 105, a transmission data control unit 106, a coding unit 107, a modulation unit 108, a transmission unit 109, a radio resource control unit 110, a transmit antenna T01, and a receive antenna R01. The "unit" in the figure is an element which realizes functions and each procedure of the terminal apparatus 1, which is represented also as a term of a section, a circuit, a configuration apparatus, a device, a unit and the like.

Note that, the terminal apparatus 1 which is capable of D2D (or is interested to perform D2D communication or supports D2D communication) is abbreviated as the terminal apparatus 1 simply in some cases. In communication related to D2D, the terminal apparatus 1 is able to become either of the terminal apparatus 1 that transmits the D2D (D2D transmission (the terminal apparatus 1-1 of FIG. 7)) and the terminal apparatus 1 that receives the D2D (D2D reception (the terminal apparatus 1-2 of FIG. 7)).

The radio resource control unit 110 executes each function of an RRC (Radio Resource Control) layer which carries out radio resource control of the terminal apparatus 1. The reception data control unit 104 and the transmission data control unit 106 execute each function of a MAC (Medium Access Control) layer, an RLC (Radio Link Control) layer, and a PDCP (Packet Data Convergence Protocol) layer, which manage a data link layer.

Note that, in order to support, in parallel (simultaneously), reception processing and transmission processing of a plurality of frequencies (frequency bands, frequency bandwidths) or in the same subframe of one certain cell, the terminal apparatus 1 may have a configuration including a plurality of sets each of which is formed by a part or whole of reception-based blocks (the reception unit 101, the demodulation unit 102, the decoding unit 103, and the receive antenna R01), a plurality of frequencies (frequency band, frequency bandwidths), and transmission-based blocks (the coding unit 107, the modulation unit 108, the transmission unit 109, and the transmit antenna T01).

With regard to the reception processing of the terminal apparatus 1, from the radio resource control unit 110, reception data control information is input to the reception data control unit 104, and physical layer control information which is a control parameter for controlling each block is input to the physical layer control unit 105. The physical layer control information is information which includes parameter configuration required for radio communication control of the terminal apparatus 1, which is formed of reception control information and transmission control information.

The physical layer control information is configured by, for example, radio connection resource configuration, cell-specific broadcast information, or a system parameter, which is transmitted in an individual (dedicated) manner from the base station apparatus 2 to the terminal apparatus 1, and input to the physical layer control unit 105 as necessary by the radio resource control unit 110. The physical layer control unit 105 appropriately inputs the reception control information which is control information about reception to the reception unit 101, the demodulation unit 102 and the decoding unit 103.

The reception control information may include, as downlink scheduling information, information such as information of a reception frequency band, a reception timing related to physical channels and physical signals, a multiplexing method, radio resource control information, SA resource pool information, D2D resource pool information, and a transmission timing related to D2D (or D2D-TA which is timing adjustment information related to D2D). The reception data control information is downlink control information including secondary cell deactivation timer information, DRX control information, multi-cast data reception information, downlink retransmission control information, SA reception control information, D2D reception control information, and the like, and includes control information about each downlink of the MAC layer, the RLC layer, and the PDCP layer.

A reception signal is received by the reception unit 101 via the receive antenna R01. In the case of D2D, the reception signal is a transmission signal transmitted by the terminal apparatus 1 in some cases. The reception unit 101 receives a signal from the base station apparatus 2 (or the terminal apparatus 1) in accordance with a frequency and a frequency band which are notified with the reception control information. The received signal is input to the demodulation unit 102. The demodulation unit 102 performs demodulation of the signal. The demodulation unit 102 inputs the demodulated signal to the decoding unit 103.

The decoding unit 103 decodes the input signal and inputs each decoded data (downlink data and downlink control data, which are also referred to as a downlink transport block) to the reception data control unit 104. A MAC control element (MAC-CE) transmitted from the base station apparatus 2 with each data is also decoded at the decoding unit 103 and related data is input to the reception data control unit 104.

The reception data control unit 104 performs control of the physical layer control unit 105 (for example, activation/deactivation of a cell, DRX control, transmission timing adjustment, and the like) based on the received MAC control element, buffering for each decoded data, and error correction control (HARQ) for retransmitted data. Among respective pieces of data input to the reception data control unit 104, related data is input (transferred) to the radio resource control unit 110.

In addition, the reception data control unit 104 adjusts a reception timing (frame synchronization, subframe synchronization, symbol synchronization, etc.) of the terminal apparatus 1 based on a reception timing of a synchronization signal received by the reception unit 101 or the like. The reception timing is managed in the physical layer control unit 105 and fed back to the reception unit 101 or the transmission unit 109, and thereby downlink synchronization and/or uplink synchronization are/is appropriately adjusted.

Moreover, with regard to transmission processing of the terminal apparatus 1, from the radio resource control unit 110, transmission data control information is input to the transmission data control unit 106, and the physical layer control information which is the control parameter for controlling each block is input to the physical layer control unit 105. The physical layer control unit 105 appropriately inputs transmission control information, which is control information about transmission, to the coding unit 107, the modulation unit 108, and the transmission unit 109.

The transmission control information includes, as uplink scheduling information, information such as coding information, modulation information, information of a transmission frequency band, timing information (or TA) related to physical channels and physical signals, a multiplexing method, radio resource arrangement information, SA resource pool information, D2D resource pool information, and timing information related to D2D (or D2D-TA).

The transmission data control information is uplink control information which includes DTX control information, random access configuration information, uplink shared channel information, logical channel priority information, resource request configuration information, cell group information, uplink retransmission control information, a buffer status report, D2D transmission control information, and the like. The radio resource control unit 110 may configure plural pieces of random access configuration information respectively corresponding to a plurality of cells to the transmission data control unit 106.

The radio resource control unit 110 manages timing adjustment information and a transmission timing timer, which are used for adjustment of an uplink transmission timing, and manages a state of the uplink transmission timing (a transmission timing adjustment state or a transmission timing non-adjustment state) for each cell (or for each cell group or for each TA group). The timing adjustment information and the transmission timing timer are included in the transmission data control information.

Note that, when it is necessary to manage the state of a plurality of uplink transmission timings, the transmission data control unit 106 manages timing adjustment information corresponding to an uplink transmission timing of each of the plurality of cells (or a cell group, a TA group). Furthermore, the transmission data control unit 106 also manages a state of a transmission timing related to D2D when necessary. The resource request configuration information includes at least maximum transmission counter configuration information and radio resource request prohibit timer information. The radio resource control unit 110 may configure plural pieces of resource request configuration information respectively corresponding to a plurality of cells to the transmission data control unit 106.

Transmission data (uplink data and uplink control data, which are also referred to as an uplink transport block) which is invoked at the terminal apparatus 1 is input to the transmission data control unit 106 at any timing from the radio resource control unit 110 (or a higher layer unit such as a non-access stratum layer unit (not illustrated)). At this time, the transmission data control unit 106 calculates a quantity of the input transmission data (uplink buffering quantity). Moreover, the transmission data control unit 106 has a function of discriminating whether the input transmission data is data belonging to a control-plane or data belonging to a user-plane.

When the transmission data is input, the transmission data control unit 106 stores the transmission data in an uplink buffer (not illustrated) in the transmission data control unit 106. Moreover, based on a degree of priority of the transmission data stored in the uplink buffer, the transmission data control unit 106 performs multiplexing and assembling, and generates a MAC PDU. Then, the transmission data control unit 106 judges whether a radio resource needed for transmission of the input transmission data is assigned to the terminal apparatus 1.

Based on the assignment of the radio resource, the transmission data control unit 106 selects any one of a physical uplink shared channel PUSCH, a radio resource request using a physical uplink control channel (SR-PUCCH), and a radio resource request using a physical random access channel, and requests, to the physical layer control unit 105, control processing for transmitting the selected channel.

Here, based on whether the input transmission data is normal transmission data for the base station apparatus 2 or transmission data related to D2D for another terminal apparatus 1, the transmission data control unit 106 generates a different buffer status report. In other words, the transmission data control unit 106 generates a buffer status report based on a buffering quantity of the normal transmission data (a normal buffer status report (Normal BSR), a first buffer status report) or a buffer status report based on a buffering quantity of the transmission data related to D2D (a buffer status report for D2D (ProSe BSR), a second buffer status report). In addition, the coding unit 107 appropriately codes each data in accordance with the transmission control information, and inputs the resultant to the modulation unit 108.

The modulation unit 108 performs modulation processing appropriately based on a channel structure for transmitting each of coded data. The transmission unit 109 performs mapping of each data subjected to the modulation processing to a frequency domain, converts a signal of the frequency domain into a signal of a time domain, and carries it on a carrier wave of a given frequency to perform power amplification. The transmission unit 109 further adjusts the uplink transmission timing in accordance with the timing adjustment information for each cell (or for each cell group, for each TA group), which is input from the radio resource control unit 110, and transmits a signal via the transmit antenna T01.

In addition, when necessary, the transmission unit 109 adjusts a transmission timing (reception timing) of the transmission data related to D2D in accordance with the timing adjustment information related to D2D. The physical uplink shared channel in which uplink control data is arranged may include, for example, a layer 3 message (radio resource control message; RRC message) in addition to user data.

In FIG. 1, though other components of the terminal apparatus 1 and a transmission path of data (control information) between the components are omitted, it is apparent that a plurality of blocks having other functions necessary for operation as the terminal apparatus 1 are included as components. For example, a non-access stratum layer unit and an application layer unit, which carry out control with a core network, exist in a higher layer than that of the radio resource control unit 110.

Figure 2:
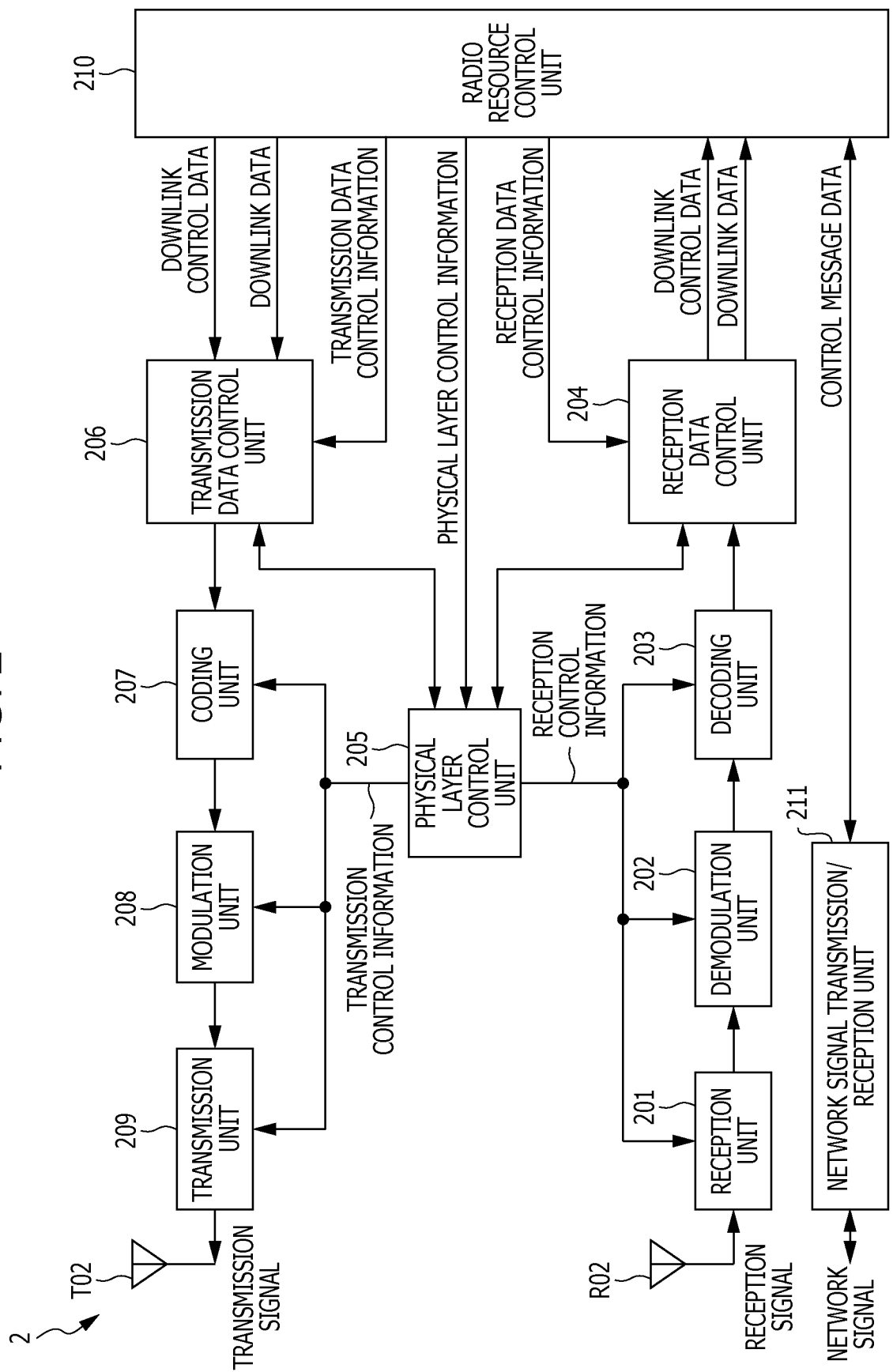
FIG. 2 is a block diagram illustrating an example of a schematic configuration of a base station apparatus according to the embodiment of the invention.

FIG. 2 is a block diagram illustrating an example of the base station apparatus 2 according to the first embodiment of the invention. The base station apparatus is composed of at least a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, a network signal transmission/reception unit 211, a transmit antenna T02, and a receive antenna R02. The "unit" in the figure is an element which realizes functions and each procedure of the base station apparatus 2, which is represented also as a term of a section, a circuit, a configuration apparatus, a device, a unit, and the like.

The radio resource control unit 210 executes each function of an RRC (Radio Resource Control) layer which carries out radio resource control of the base station apparatus 2. The reception data control unit 204 and the transmission data control unit 206 execute each function in a MAC (Medium Access Control) layer, an RLC (Radio Link Control) layer, and a PDCP (Packet Data Convergence Protocol) layer which manage a data link layer.

Note that, in order to support transmission/reception processing of a plurality of frequencies (frequency bands, frequency bandwidths) or in the same subframe of a cell through carrier aggregation or the like, the base station apparatus 2 may have a configuration including a plurality of sets each of which is formed by a part or whole of reception-based blocks (the reception unit 201, the demodulation unit 202, the decoding unit 203, and the receive antenna R02), a plurality of frequencies (frequency bands, frequency bandwidths), and transmission-based blocks (the coding unit 207, the modulation unit 208, the transmission unit 209, and the transmit antenna R02).

The radio resource control unit 210 inputs downlink data and downlink control data to the transmission data control unit 206. When there is a MAC control element to be transmitted to the terminal apparatus 1, the transmission data control unit 206 inputs the MAC control element and each data (downlink data or downlink control data) to the coding unit 207. The coding unit 207 codes the MAC control element and each data, which are input, and inputs the resultant to the modulation unit 208. The modulation unit 208 performs modulation of a coded signal.

The signal modulated by the modulation unit 208 is input to the transmission unit 209. After mapping the input signal into a frequency domain, the transmission unit 209 converts the signal of the frequency domain into a signal of a time domain, performs power amplification by carrying it on a carrier wave of a given frequency, and transmits the signal via the transmit antenna T02. A physical downlink shared channel in which the downlink control data is arranged typically configures a layer 3 message (RRC message).

The reception unit 201 converts a signal, which is received from the terminal apparatus 1 via the receive antenna R02, into a base-band digital signal. When cells of a plurality of different transmission timings are configured to the terminal apparatus 1, the reception unit 201 receives a signal at different timings for each cell (or for each cell group, for each TA group). The digital signal converted at the reception unit 201 is input to the demodulation unit 202 and demodulated. The signal demodulated at the demodulation unit 202 is subsequently input to the decoding unit 203.

The decoding unit 203 decodes the input signal and inputs each decoded data (uplink data and uplink control data) to the reception data control unit 204. The MAC control element which is transmitted from the terminal apparatus 1 with each data is also decoded at the decoding unit 203, and related data is input to the reception data control unit 204.

The reception data control unit 204 performs control of the physical layer control unit 205 (for example, control related to a power headroom report, control related to a buffer status report, etc.) based on the received MAC control element, buffering of each decoded data, and error correction control (HARQ) for retransmitted data. Each data input to the reception data control unit 204 is input (transferred) to the radio resource control unit 210 as necessary.

In addition, when the buffer status report from the terminal apparatus 1 is input from the decoding unit 203, the reception data control unit 204 discriminate between a transmission resource request for communication with the base station apparatus itself and a transmission resource request for device-to-device data communication, and configures a transmission resource to be assigned to the terminal apparatus 1.

Physical layer control information needed for control of each of the blocks is information including parameter configuration needed for radio communication control of the base station apparatus 2, which is composed of reception control information and transmission control information. The physical layer control information is configured by a higher network apparatus (MME, a gateway apparatus (SGW), OAM, or the like) or a system parameter, and input to the control unit 204 as necessary by the radio resource control unit 210.

The physical layer control unit 205 inputs the physical layer control information involved in transmission as the transmission control information to each of the blocks of the coding unit 207, the modulation unit 208, and the transmission unit 209, and appropriately inputs the physical layer control information involved in reception as the reception control information to each of the blocks of the reception unit 201, the demodulation unit 202 and the decoding unit 203.

Reception data control information includes control information about the uplink of the terminal apparatus 1, which corresponds to each of a MAC layer, an RLC layer, and a PDCP layer of the base station apparatus 2. Transmission data control information includes control information about the downlink of the terminal apparatus 1, which corresponds to each of the MAC layer, the RLC layer, and the PDCP layer of the base station apparatus 2. That is, the reception data control information and the transmission data control information are configured for each terminal apparatus 1.

The network signal transmission/reception unit 211 performs transmission (transfer) or reception of a control message or user data between the base station apparatuses 2 or between a higher network apparatus (MME, SGW) and the base station apparatus 2. In FIG. 2, though other components of the base station apparatus 2 and a transmission path of data (control information) between the components are omitted, it is apparent that a plurality of blocks having other functions necessary for operation as the base station apparatus 2 are included as components. For example, a radio resource management unit and an application layer unit exist on top of the radio resource control unit 210.

Figure 3:
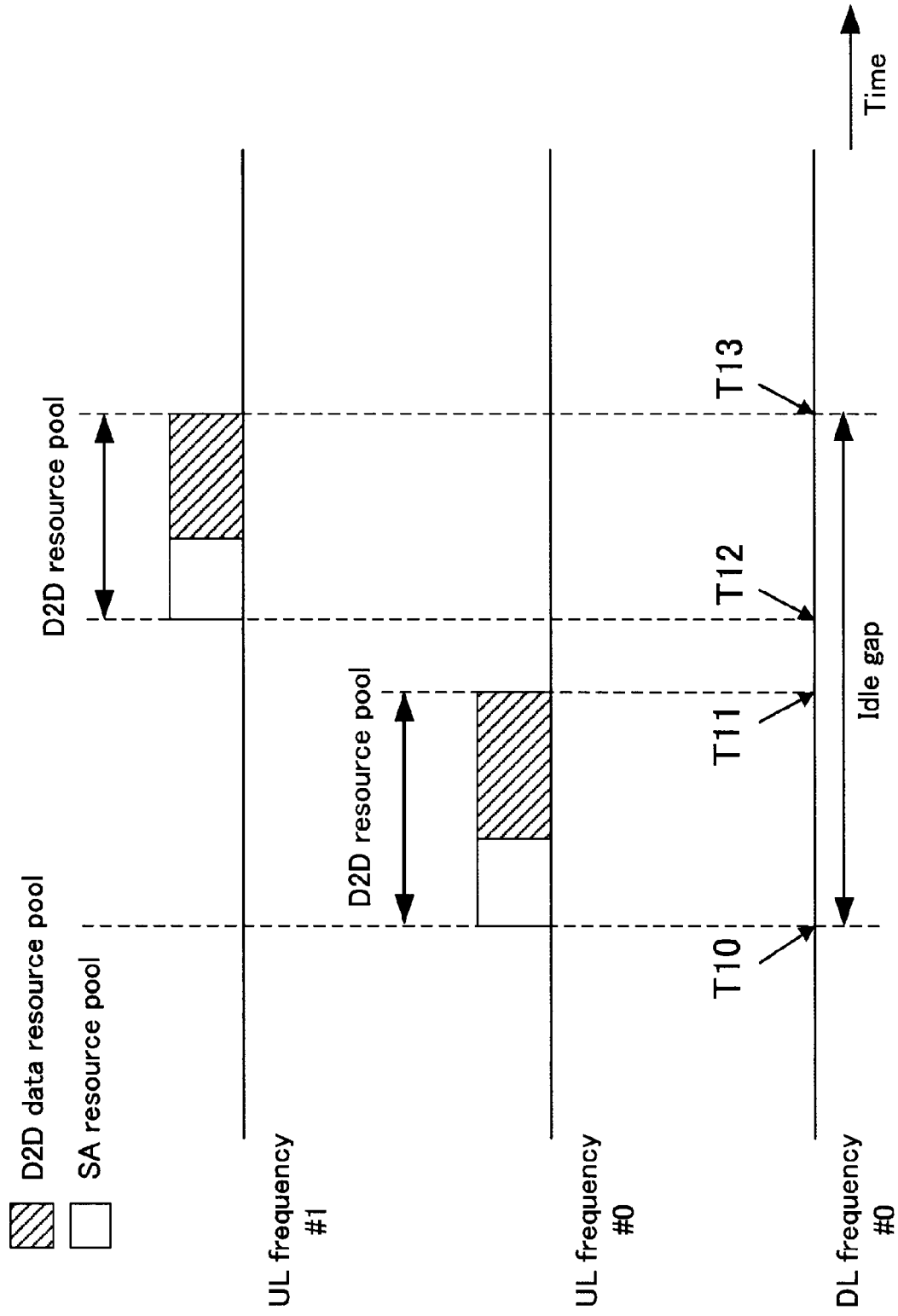
FIG. 3 is a view illustrating an example of procedure related to transmission/reception with a different frequency, which supports D2D, in the terminal apparatus according to the embodiment of the invention.
Figure 4:
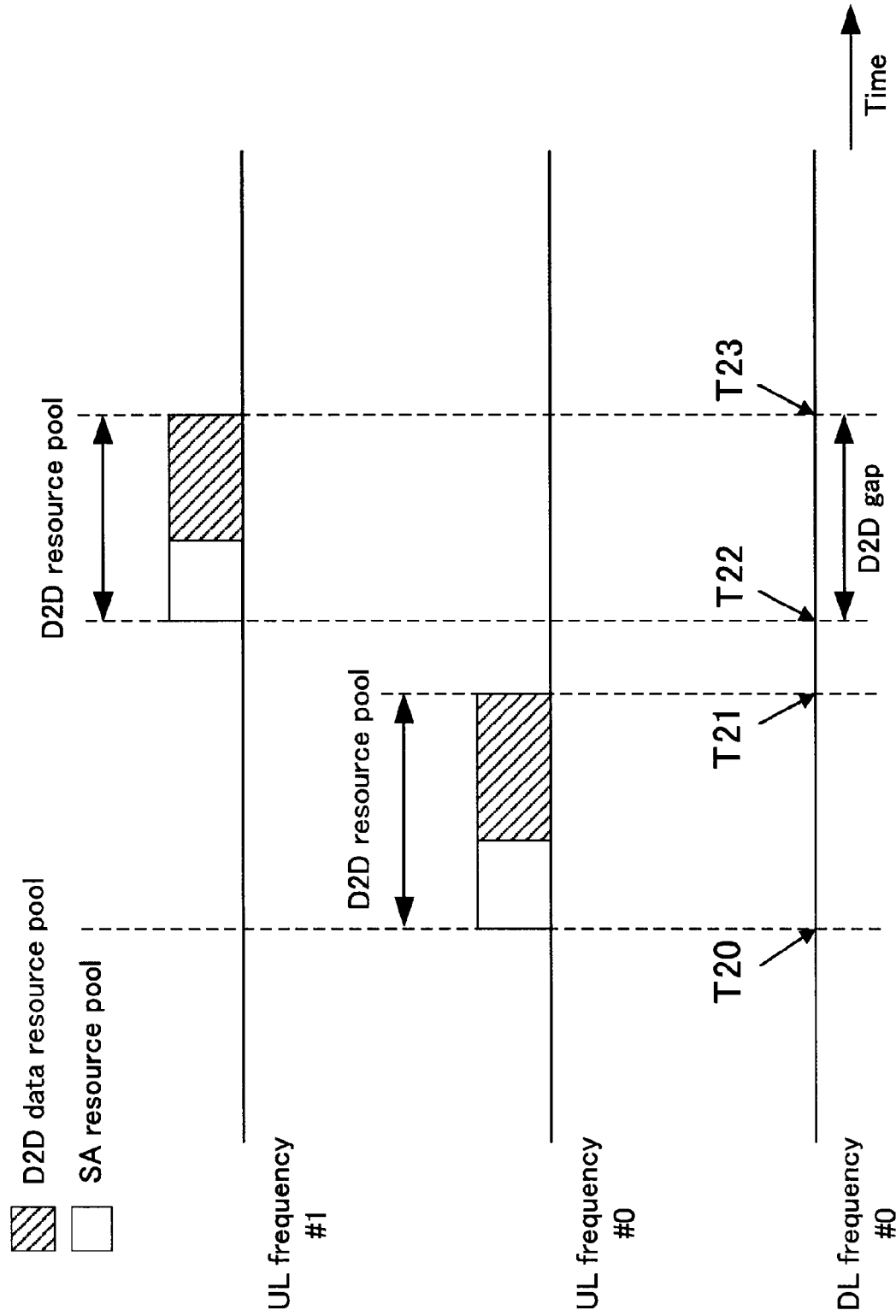
FIG. 4 is a view illustrating another example of the procedure related to transmission/reception with a different frequency, which supports D2D, in the terminal apparatus according to the embodiment of the invention.

FIG. 3 and FIG. 4 are views each illustrating an example of a communication method related to transmission/reception of D2D of the terminal apparatus 1 in a cell having a frequency (frequency band) which supports D2D and with a frequency other than that of the aforementioned cell.

Horizontal axes in each figure indicate a time lapse, and a lower part in the figure indicates a timing of an operation of the terminal apparatus 1 with a downlink frequency (DL frequency #0) in a serving cell of the terminal apparatus 1, a middle part in the figure indicates a domain of a resource pool of D2D in an uplink frequency (UL frequency #0) in the serving cell of the terminal apparatus 1, and an upper part in the figure indicates a domain of a resource pool of D2D in an uplink frequency (UL frequency #1) which is different from the uplink frequency (UL frequency #0) in the serving cell of the terminal apparatus 1 and which supports D2D. Note that, in the case of TDD, the downlink frequency (DL frequency #0) and the uplink frequency (UL frequency #0) in the serving cell are equal.

The communication method of FIG. 3 is carried out in a case where the terminal apparatus 1 in an idle mode is interested to perform D2D communication. On the other hand, the communication method of FIG. 4 is carried out in a case where the terminal apparatus 1 in a connected mode is interested to perform D2D communication. The case of being interested to perform D2D communication means, for example, a case where the terminal apparatus 1 is a terminal apparatus capable of coping with a series of control related to D2D and transmission or reception of services related to the D2D or both of them are instructed from a higher layer such as the NAS layer unit or the application layer unit.

The terminal apparatus 1 is positioned inside an area (in coverage) of the serving cell which is at least capable of D2D. Before starting the present flowchart, the terminal 1 acquires information related to D2D each in the same frequency (intra-frequency) and/or different frequencies (inter-frequency). The terminal apparatus 1 may further acquire information related to D2D between RATs (inter-RAT). The information related to D2D is neighboring cell information necessary for services of D2D, which is indicated with at least frequency (frequency band) ID information, cell ID information, information of resource configuration related to D2D (for example, resource assignment information of Mode 1/Mode 2), and the like.

The information related to D2D is provided from the base station apparatus 2 with broadcast information or an individual RRC message. Based on the acquired information related to D2D, the terminal apparatus 1 is able to know with which frequency (frequency band, RAT) a network provides services related to D2D.

Based on the acquired information related to D2D, the terminal apparatus 1 judges a mode which is capable of (supports) transmission/reception of D2D in a neighboring cell having a frequency different from that of the connected cell (that is, the serving cell) (referred to as an inter-frequency cell). The terminal apparatus 1 is able to judge the supporting mode in the inter-frequency cell based on the information related to D2D.

Whether or not to perform transmission/reception of D2D in the inter-frequency cell is autonomously judged by the terminal apparatus 1 based on a combination of frequency bands, which allow the terminal apparatus 1 to perform the transmission/reception, and a frequency which supports the D2D. Particularly, the terminal apparatus 1 may consider that supporting Mode 2 of the D2D in the inter-frequency cell is one of the conditions.

Note that, the terminal apparatus 1 may also consider a measurement result (reception quality) of the inter-frequency cell as a condition. For example, in a case where the measurement result (RSRP, RSRQ, or the like) of the inter-frequency cell does not satisfy a cell selection criterion, the transmission/reception of the D2D may not be performed in the inter-frequency cell. Alternatively, in a case where at least one measurement result of the inter-frequency cell falls below a notified threshold, the transmission/reception of the D2D may not be performed in the inter-frequency cell. Otherwise, in a case where the measurement result of the inter-frequency cell exceeds a notified threshold, the transmission/reception of the D2D may be performed in the inter-frequency cell.

In addition or instead, the terminal apparatus 1 may consider a measurement result of the serving cell as a condition. For example, in a case where the measurement result of the serving cell exceeds a notified threshold, the transmission/reception of the D2D may not be performed in the inter-frequency cell. Alternatively, in a case where the measurement result of the serving cell falls below a notified threshold, the transmission/reception of the D2D may be performed in the inter-frequency cell. In addition, a timer for judging whether such conditions have been satisfied continuously for a fixed time may be further used.

In addition or instead, the terminal apparatus 1 may consider a measurement result of a D2DSS, which is detected in the inter-frequency cell, as a condition. For example, in a case where the measurement result (RSRP, RSRQ, or the like) of the D2DSS detected in the inter-frequency cell falls below a notified threshold, the transmission/reception of the D2D may not be performed in the inter-frequency cell.

A threshold or a value of the timer, which is to be used for the condition, may be notified to each cell from the base station apparatus 2 with broadcast information, or notified to each terminal apparatus 1 with an individual RRC message, or a static value may be configured in advance by a system. For example, a parameter to be used for cell selection (or cell re-selection) may be used again for the threshold or the timer, or a new parameter may be notified for the D2D. Alternatively, different values may be configured in accordance with modes of the D2D. The terminal apparatus 1 may regard the inter-frequency cell, which satisfies the condition, to be virtually in coverage.

In a case where the transmission/reception of the D2D is performed in the inter-frequency cell, based on system information related to D2D (information related to D2D) acquired in the inter-frequency cell, the terminal apparatus 1 starts services of the D2D in the inter-frequency cell. Note that, when the D2D is performed in the inter-frequency cell, transmission of Mode 1 which requires resource assignment from the base station apparatus 2 is not performed. When permission is given with the information related to D2D of the inter-frequency cell, which is acquired from the base station apparatus 2 (or when resource configuration is notified), reception of Mode 1 and/or transmission/reception of Mode 2 are performed in the aforementioned inter-frequency cell.

Figure 5:
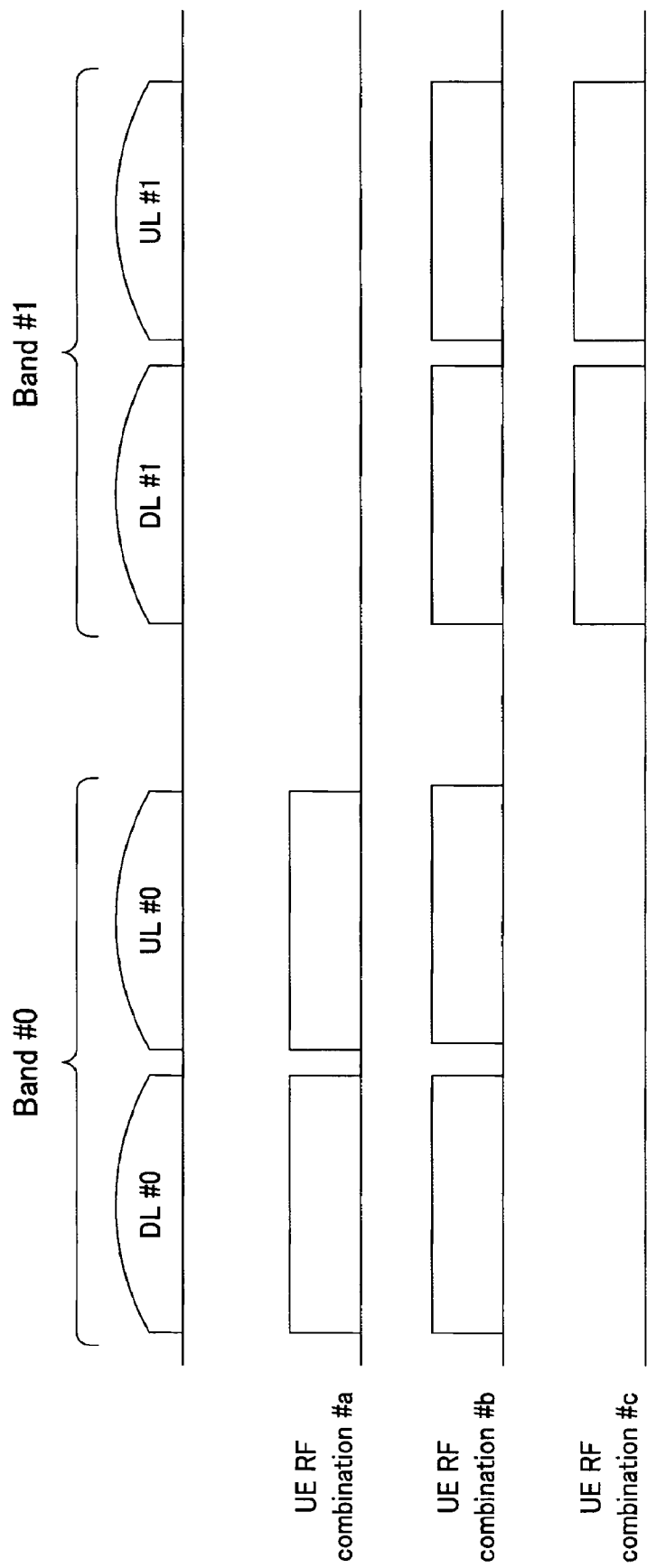
FIG. 5 is a view illustrating an example of a combination of frequency bands capable of transmission/reception in the terminal apparatus according to the embodiment of the invention.

FIG. 5 is a view illustrating an example of a combination of frequency bands (band combination) capable of transmission/reception in the terminal apparatus 1 capable of D2D. The combination of frequency bands is configured as RF capability for each terminal apparatus 1.

In the figure, each of DL #0 and DL #1 indicates a frequency of the downlink, and each of UL #0 and UL #1 indicates a frequency of the uplink. Moreover, each of DL #0 and UL #0 is a frequency of a part of Band #0 which is a certain frequency band, and each of DL #1 and UL #1 is a frequency of a part of Band #1 which is another certain frequency band. In the case of TDD, DL #0 and UL #0 (or DL #1 and UL #1) are the same frequencies.

As examples of the RF capability which is possible in the terminal apparatus 1, three combinations of the frequency bands are illustrated in FIG. 5.

A first combination (UE RF combination #a) indicates that an RF of the terminal apparatus 1 is tuned to frequencies of DL #0 and UL #0, reception is allowed with the frequency of DL #0, and transmission is similarly allowed with the frequency of UL #0. In addition, in the case of being compatible with the D2D, the first combination indicates that reception of the D2D (that is, reception of a D2DSS, a PD2DSCH, a PUSCH (or a D2D dedicated physical channel, which transfers SA or the like), etc.) is allowed with the frequency of UL #0.

A second combination (UE RF combination #b) indicates that the RF of the terminal apparatus 1 is tuned to frequencies of DL #0 and UL #0, reception is allowed with the frequency of DL #0, and transmission is similarly allowed with the frequency of UL #0. Furthermore, the second combination indicates that another RF is tuned to frequencies of DL #1 and UL #1, reception is allowed with the frequency of DL #1, and transmission is similarly allowed with the frequency of UL #1. In other words, the second combination is RF capability which allows transmission/reception with respect to a plurality of frequency bands in the same subframe. In addition, in the case of being compatible with the D2D, the second combination indicates that reception of the D2D (that is, reception of the D2DSS, the PD2DSCH, the PUSCH (or a D2D dedicated physical channel, which transfers SA or the like), etc.) is allowed with the frequencies of UL #0 and UL #1.

A third combination (UE RF combination #c) indicates that the RF of the terminal apparatus 1 is tuned to frequencies of DL #1 and UL #1, reception is allowed with the frequency of DL #1, and transmission is similarly allowed with the frequency of UL #1. In addition, in the case of being compatible with the D2D, the third combination indicates that reception of the D2D (that is, reception of the D2DSS, the PD2DSCH, the PUSCH (or a D2D dedicated physical channel, which transfers SA or the like), etc.) is allowed with the frequency of UL #1.

It is set here that a frequency of the serving cell of the terminal apparatus 1 is DL #0 and a frequency supporting (permitting) the transmission/reception of the D2D (D2D supported frequency) is UL #0. At this time, the terminal apparatus 1 which uses the first combination as the RF capability is able to perform the transmission/reception of the D2D with Band #0 including the same frequencies. On the other hand, in a case where a frequency supporting (permitting) the transmission/reception of the D2D is UL #1, when not supporting the second combination and/or the third combination as the RF capability, the terminal apparatus 1 which uses the first combination as the RF capability is not able to perform the transmission/reception of the D2D with Band #1.

Description will be given for the communication method of D2D in the inter-frequency cell by the terminal apparatus 1 in the idle mode. In FIG. 3, the terminal apparatus 1 intermittently monitors a transmission signal (PDCCH) from the base station apparatus 2 with a downlink frequency (DL frequency #0) in accordance with a DRX cycle which indicates an interval between paging occasions on which paging can be transmitted. Specifically, the terminal apparatus 1 monitors the PDCCH, in which CRC is masked with a P-RNTI (Paging-Radio Network Temporary Identity), in a common search space from a starting time of the paging occasion, and tries to receive paging. The reception of the paging is performed in a time length which is called an active time and required for monitoring the PDCCH.

The terminal apparatus 1 regards a period from an end of the active time to a starting time of a next paging occasion as a time period in which transmission/reception processing with respect to a cell which is normally camped on is not necessarily performed, and judges that an idle gap is able to be generated. In a period in which the idle gap is able to be generated, in a case where the RF capability of the terminal apparatus 1 supports D2D in a period (in the figure, from a time T10 to a time T11 and from a time T12 to a time T13) when resource pools for data transmission/reception of SA and D2D are configured, the terminal apparatus 1 may try the transmission/reception of the D2D in the inter-frequency cell.

More specifically, in the period of the idle gap, the terminal apparatus 1 may receive and/or transmit the SA in the SA resource pool and receive and/or transmit data related to D2D in the D2D data resource pool in each uplink (UL frequency #0, UL frequency #1) supporting the D2D. Note that, the transmission/reception of the D2D is not limited to mean that the terminal apparatus 1 always performs both operations of the transmission and the reception, and the terminal apparatus 1 may perform only reception processing related to D2D in the case of being interested to perform only the reception of the D2D communication, and may perform only transmission processing related to D2D in the case of being interested to perform only the transmission of the D2D communication.

A gap length of the idle gap may be autonomously judged (configured) by the terminal apparatus 1. Moreover, when there are a plurality of uplink frequencies capable of transmission/reception of D2D, the terminal apparatus 1 may judge a degree of priority thereof and an order thereof. For example, D2D of an uplink frequency of the serving cell may have priority. In addition, the gap length may be configured for each frequency. The gap length of the idle gap needs to ensure a length during which both of the SA related to D2D, in which the terminal apparatus 1 is interested, and D2D data are able to be received. For example, the terminal apparatus 1 may decide the length of the gap length based on information of a time domain of the resource pool related to D2D, which is acquired from broadcast information.

Description will be given for the communication method of D2D in the inter-frequency cell by the terminal apparatus 1 in the connected mode. In FIG. 4, the terminal apparatus 1 monitors a transmission signal (PDCCH) from the base station apparatus 2. During DRX, the terminal apparatus 1 monitors the PDCCH in an active time which occurs intermittently.

The terminal apparatus 1 tries the transmission/reception of the D2D in a period (in the figure, from a time T20 to a time T21) when resource pools for data transmission/reception of SA and the D2D are configured in the uplink of the serving cell. In this period (from the time T20 to the time T21), it is also possible to notify, with an RRC message, that the base station apparatus 2 does not perform scheduling of the downlink for the terminal apparatus 1.

Moreover, in a case where RF capability of the terminal apparatus 1 supports the D2D in a period (in the figure, from a time T22 to a time T23) when resource pools for data transmission/reception of the SA and the D2D are configured in the uplink of the inter-frequency cell, the terminal apparatus 1 may try the transmission/reception of the D2D in the inter-frequency cell.

More specifically, in a case where the RF capability of the terminal apparatus 1 supports the D2D, the terminal apparatus 1 may receive and/or transmit the SA in the SA resource pool and receive and/or transmit data related to D2D in the D2D data resource pool in a period of the uplink (UL frequency #1) of the inter-frequency cell, in which the resource pool of the D2D is configured. Note that, the transmission/reception of the D2D is not limited to mean that the terminal apparatus 1 always performs both operations of the transmission and the reception, and the terminal apparatus 1 may perform only reception processing related to D2D in the case of being interested to perform only the reception of the D2D communication, and may perform only transmission processing related to D2D in the case of being interested to perform only the transmission of the D2D communication.

In this manner, in a case where it is possible to perform transmission/reception of D2D in an inter-frequency cell without changing RF configuration of a serving cell, the terminal apparatus 1 is able to perform the transmission/reception of the D2D in the inter-frequency cell based on RF capability of the terminal apparatus 1 without affecting transmission/reception (also including transmission/reception other than D2D) in the serving cell (however, transmission in Mode 1 in the inter-frequency cell is excluded). Moreover, for example, in a case where a gap (D2D gap) for the transmission/reception of the D2D in the inter-frequency cell is configured from the base station apparatus 2 (for example, from the time T22 to the time T23 of FIG. 4), the terminal apparatus 1 is able to perform the transmission/reception of the D2D by changing RF configuration of the inter-frequency cell in a period of the D2D gap.

Alternatively, in a case where autonomous generation of the D2D gap is permitted by the base station apparatus 2, the terminal apparatus 1 is able to perform the transmission/reception of the D2D by changing the RF configuration of the inter-frequency cell in the period of the D2D gap. In this case, a gap length of the D2D gap needs to ensure a length during which both of the SA related to D2D, in which the terminal apparatus 1 is interested, and D2D data are able to be received. For example, the terminal apparatus 1 may decide the length of the gap length based on information of a time domain of a resource pool related to D2D, which is acquired from broadcast information.

Note that, even when the RF capability of the terminal apparatus 1 supports the D2D in the inter-frequency cell, based on indicators of a load, capacity, and the like in each cell, the base station apparatus 2 is also able to notify, with broadcast information or an individual RRC message, the terminal apparatus 1 not to perform the transmission/reception of the D2D in the inter-frequency cell as to each frequency (cell).

For each of the SA resource pool and the D2D data resource pool which are described in FIG. 3 and FIG. 4, both of resource pools for transmission and for reception may be configured, or either of them may be configured. The resource pool for transmission and the resource pool for reception may be subjected to time division multiplexing, or may be subjected to frequency multiplexing. Further, a set of the SA resource pool for transmission and the D2D data resource pool for transmission and a set of the SA resource pool for reception and D2D data resource pool for reception may be subjected to time division multiplexing or frequency multiplexing.

The terminal apparatus 1 may obtain a reference timing, which is to be a reference for transmitting (receiving) SA in the uplink (UL frequency #0, UL frequency #1), based on a synchronization timing (DL timing) of a signal (for example, a synchronization signal) of a frequency of a downlink subframe which corresponds to (links with) a frequency of an uplink transmission subframe with which transmission/reception of D2D is performed.

For example, the terminal apparatus 1 may obtain a timing, at which SA is received with UL frequency #1, based on a synchronization timing of the corresponding downlink (DL frequency #1), and may obtain a timing, at which transmission data related to D2D is received (that is, a reception timing of a PUSCH (or a D2D dedicated physical channel)), based on a reference timing of the SA and timing adjustment information related to D2D (D2D-TA).

The D2D-TA may be configured for each received SA. In this case, based on the reference timing of the received SA and the D2D-TA, the terminal apparatus 1 receives each corresponding transmission data related to D2D. Moreover, the D2D-TA may be applied only in a case where D2D of Mode 1 is received. In addition, the D2D-TA may be the same as TA.

When transmitting the transmission data related to D2D, the terminal apparatus 1 may obtain a transmission timing of a PUSCH (or a D2D dedicated physical channel) based on the reference timing of the SA and the D2D-TA. Moreover, the terminal apparatus 1 may perform transmission by including information indicating the D2D-TA in the SA. Further, the D2D-TA may be applied only in a case where D2D of Mode 1 is transmitted. Furthermore, the D2D-TA may be the same as TA.

As above, with respect to D2D serviced in an inter-frequency neighboring cell having a frequency different from that of a serving cell, the terminal apparatus 1 is able to perform transmission/reception of D2D even with a different frequency, based on an RF capability. Moreover, differently from conventional procedure (control) of inter-frequency measurement, in order to acquire signals related to D2D and configuration of channels, the terminal apparatus 1 needs to acquire broadcast information with the different frequency. Here, the broadcast information (system information) means a part or all of respective pieces of broadcast information which is notified by an MIB, an SIB 1, and/or a system information message.

Figure 6:
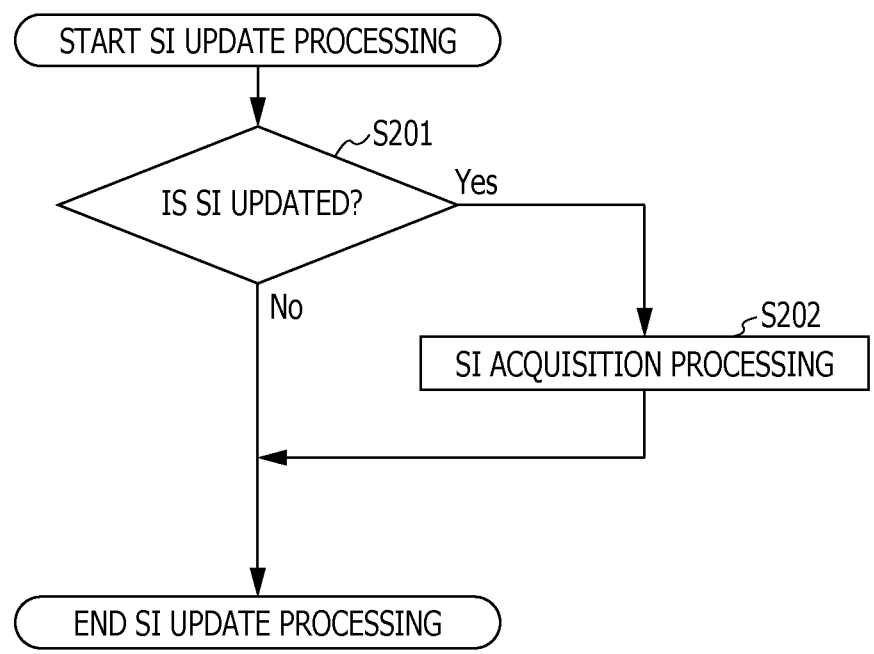
FIG. 6 is a flowchart illustrating an example of procedure of updating system information according to the embodiment of the invention.

FIG. 6 is a flowchart illustrating an example of procedure related to acquisition of broadcast information with a different frequency by the terminal apparatus 1. In an inter-frequency cell supporting D2D, the terminal apparatus 1 detects presence or absence of update of system information of the inter-frequency cell at step S201. The update of the system information is able to be detected (confirmed, judged) by confirming whether or not system information update information (systemInfoModification) is notified with a paging message in a relating different frequency or whether or not a tag value (systemInfoValueTag) related to update in an SIB 1 is changed.

In a case where the system information is updated (Yes at step S201), the terminal apparatus 1 performs re-acquisition of the system information (step S202). On the other hand, in a case where the system information is not updated (No at step S201), the terminal apparatus 1 may continue to use the system information which is currently held.

Note that, the terminal apparatus 1 may perform transmission/reception of D2D as long as the re-acquisition of the system information is not affected. Moreover, the terminal apparatus 1 may perform re-acquisition of the system information over a plurality of DRX cycles.

The base station apparatus 2 transmits a paging message, which is transmitted in a cell to be updated, with the system information update information included, before the system information is changed (updated). Moreover, the base station apparatus 2 performs increment of the tag value, which is configured in the SIB 1, after the system information is changed.

With such a configuration, in the case of being interested to perform D2D communication, based on at least a combination of RFs (RF Capability) embedded in the terminal apparatus itself, a frequency (frequency band) of a cell supporting the D2D, and information related to D2D, which is notified with broadcast information, the terminal apparatus 1 is able to judge whether to be able to perform transmission/reception with the frequency supporting the D2D. In addition, in a case where the cell supporting the D2D is an inter-frequency cell, the terminal apparatus 1 is able to judge, based on a measurement result of a serving cell and/or the inter-frequency cell, whether or not to perform the transmission/reception of the D2D in the inter-frequency cell.

In the case of performing the transmission/reception of the D2D in the inter-frequency cell supporting the D2D, the terminal apparatus 1 is able to perform the transmission/reception of the D2D with a different frequency by using an autonomous gap. Moreover, the base station apparatus 2 is able to allow the terminal apparatus 1 to perform the transmission/reception of the D2D in the inter-frequency cell, by notifying information of a neighboring cell which provides services related to D2D. In addition, the base station apparatus 2 is able to allow the terminal apparatus 1 to perform the transmission/reception of the D2D in the inter-frequency cell, by notifying information of a gap related to D2D.

According to the first embodiment, in the case of being interested to perform D2D communication, the terminal apparatus 1 acquires broadcast information from an inter-frequency cell supporting the D2D, and, in the case of being able to perform transmission/reception of the D2D in the inter-frequency cell, is able to perform the transmission/reception of the D2D in the inter-frequency cell without performing cell re-selection or movement between cells by handover or the like, so that it is possible to efficiently perform communication related to D2D. Further, in a case where the transmission/reception of the D2D is able to be performed in the inter-frequency cell, the base station apparatus 2 is able to allow communication of the terminal apparatus 1, which is related to D2D, to be performed efficiently, by notifying the terminal apparatus 1 of information of a frequency supporting the D2D and gap information used for the transmission/reception of the D2D in the inter-frequency cell.

<Second Embodiment>

A second embodiment of the invention will be described below.

Though a case where D2D is supported in an inter-frequency cell of the terminal apparatus 1 is described in the first embodiment, a similar communication method is applicable also to a plurality of serving cells. That is, in a case where the terminal apparatus 1 supports D2D only in a primary cell, it becomes necessary to change the primary cell by handover or the like in order to perform transmission/reception of D2D by a secondary cell supporting the D2D. Then, in the second embodiment, description will be given for a communication method of D2D of the terminal apparatus 1 in a case where a plurality of serving cells are configured.

Since configurations of the terminal apparatus 1 and the base station apparatus 2 of the second embodiment may be the same as those of the first embodiment, description thereof will be omitted. However, each of the terminal apparatus 1 and the base station apparatus 2 of the second embodiment is able to realize aggregation of carriers (for example, carrier aggregation) by a plurality of cells by using at least one secondary cell in addition to a primary cell, and a series of functions related thereto.

The base station apparatus 2 notifies the terminal apparatus 1 in a connected mode of configuration of a primary cell and at least one secondary cell, and performs communication by using a plurality of serving cells. The terminal apparatus 1 regards each of frequencies of the plurality of serving cells as the same frequency (intra-frequency), and regards a frequency other than them as a different frequency (inter-frequency). The terminal apparatus 1 acquires information related to D2D in each of the same frequencies and/or the different frequency. The terminal apparatus 1 may further acquire information related to D2D between RATs (inter-RAT).

The information related to D2D is provided from the base station apparatus 2 with broadcast information or an individual RRC message. Based on the acquired information related to D2D, the terminal apparatus 1 is able to know with which frequency (frequency band, RAT) a network provides services related to D2D.

Based on the acquired information related to D2D, the terminal apparatus 1 judges a mode which is capable of (supports) transmission/reception of D2D in the secondary cell. The terminal apparatus 1 is able to judge a supporting mode in the secondary cell based on the information related to D2D.

Whether or not to perform transmission/reception of D2D in the secondary cell is autonomously judged by the terminal apparatus 1 based on a combination of frequency bands, which allow the terminal apparatus 1 to perform the transmission/reception, and a frequency which supports the D2D. Particularly, the terminal apparatus 1 may consider that supporting Mode 2 of the D2D in the secondary cell is one of the conditions.

Note that, the terminal apparatus 1 may also consider a measurement result (reception quality) of the secondary cell as a condition. For example, in a case where the measurement result (RSRP, RSRQ, or the like) of the secondary cell does not satisfy a notified threshold, the transmission/reception of the D2D may not be performed in the secondary cell. Alternatively, in a case where at least one measurement result of the secondary cell falls below a notified threshold, the transmission/reception of the D2D may not be performed in the secondary cell. Otherwise, in a case where the measurement result of the secondary cell exceeds a notified threshold, the transmission/reception of the D2D may be performed in the secondary cell.

In addition or instead, the terminal apparatus 1 may consider a measurement result of the primary cell as a condition. For example, in a case where the measurement result of the primary cell exceeds a notified threshold, the transmission/reception of the D2D may not be performed in the secondary cell. Alternatively, in a case where the measurement result of the primary cell falls below a notified threshold, the transmission/reception of the D2D may be performed in the secondary cell. In addition, a timer for judging whether such conditions have been satisfied continuously for a fixed time may be further used.

In addition or instead, the terminal apparatus 1 may consider a state of the secondary cell. For example, the transmission/reception of the D2D may be performed in the secondary cell only when the secondary cell is in an activated state or a deactivated state. Moreover, the terminal apparatus 1 may add, to the conditions, that DRX is being performed. Further, the terminal apparatus 1 may add, to the conditions, that a length of a DRX cycle is longer than a certain threshold.

In addition or instead, the terminal apparatus 1 may consider a measurement result of a D2DSS, which is detected in the secondary cell, as a condition. For example, in a case where the measurement result (RSRP, RSRQ, or the like) of the D2DSS detected in the secondary cell falls below a notified threshold, the transmission/reception of the D2D may not be performed in the secondary cell.

A threshold or a value of the timer, which is to be used for the condition, may be notified to each cell from the base station apparatus 2 with broadcast information, or notified to each terminal apparatus 1 with an individual RRC message, or a static value may be configured in advance by a system. For example, a parameter to be used for a measurement event may be used again for the threshold or the timer, or a new parameter may be notified for the D2D. Alternatively, different values may be configured in accordance with modes of the D2D.

In a case where the transmission/reception of the D2D is performed in the secondary cell, based on system information related to D2D (information related to D2D) acquired in the secondary cell, the terminal apparatus 1 starts services of the D2D in the secondary cell. When permission is given with the information related to D2D of the secondary cell, which is acquired from the base station apparatus 2, (or when resource configuration is notified) transmission/reception of Mode 1 and/or transmission/reception of Mode 2 are performed in the secondary cell.

At this time, the terminal apparatus 1 may obtain a reference timing, which is to be a reference for transmitting (receiving) SA, based on a synchronization timing of the primary cell, based on a synchronization timing (DL timing) of a signal (for example, a synchronization signal) of a frequency of a downlink subframe which corresponds to (links with) a frequency of an uplink transmission subframe of the secondary cell, with which transmission/reception of D2D is performed, or based on a timing reference cell of each TA group. Moreover, the terminal apparatus 1 may obtain a timing, at which transmission data related to D2D is received (that is, a reception timing of a PUSCH (or a D2D dedicated physical channel)) with a frequency of an uplink transmission subframe, based on a reference timing of the SA and timing adjustment information related to D2D (D2D-TA).

For the D2D-TA, a value common to the primary cell and the secondary cell may be configured. Moreover, a value for the D2D-TA may be configured for each TA group. Alternatively, the D2D-TA may be configured for each received SA. In this case, based on the reference timing of the received SA and the D2D-TA, the terminal apparatus 1 receives each corresponding transmission data related to D2D. Moreover, the D2D-TA may be applied only in a case where D2D of Mode 1 is received. In addition, the D2D-TA may be the same as TA.

When transmitting the transmission data related to D2D, the terminal apparatus 1 may obtain a transmission timing of a PUSCH (or a D2D dedicated physical channel) based on the reference timing of the SA and the D2D-TA. Moreover, the terminal apparatus 1 may perform transmission by including information indicating the D2D-TA in the SA. Further, the D2D-TA may be applied only in a case where D2D of Mode 1 is transmitted. Furthermore, the D2D-TA may be the same as TA.

In a case where an RF capability of the terminal apparatus 1 supports D2D, in a period of an uplink of the secondary cell, in which a resource pool of D2D is configured with broadcast information, the terminal apparatus 1 may receive and/or transmit the SA in an SA resource pool and receive and/or transmit data related to D2D in a D2D data resource pool, based on each of the obtained reception timings. Note that, the transmission/reception of the D2D is not limited to mean that the terminal apparatus 1 always performs both operations of the transmission and the reception, and the terminal apparatus 1 may perform only reception processing related to D2D in the case of being interested to perform only the reception of the D2D communication, and may perform only transmission processing related to D2D in the case of being interested to perform only the transmission of the D2D communication.

Moreover, in a case where both of Mode 1/Mode 2 are supported in the secondary cell, the terminal apparatus 1 may operate so as to perform both of Mode 1/Mode 2 (only reception may be performed for Mode 1) when a TA timer is counting, and to perform only Mode 2 when the TA timer expires (when the TA timer is stopped).

Moreover, in a case where Mode 1 of the D2D is supported in the secondary cell and Mode 1 of the D2D is permitted for the secondary cell, the terminal apparatus 1 may perform the transmission/reception of Mode 1 regardless of support of the D2D in the primary cell. More specifically, in a case where a cell in which the terminal apparatus 1 is notified, with broadcast information or an individual RRC message, that Mode 1 of the D2D is supported is configured as the secondary cell for the terminal apparatus 1 in the connected mode, and the terminal apparatus 1 is notified of information indicating that (transmission of) Mode 1 of the D2D is permitted in this secondary cell, the terminal apparatus 1 may perform the transmission/reception of Mode 1 of the D2D with respect to the secondary cell.

In this case, even when the D2D is not supported in the primary cell, the terminal apparatus 1 may transmit a buffer status report (ProSe BSR), which is based on a buffering quantity of transmission data related to D2D, in the primary cell. The base station apparatus 2 may transmit D2D grant in the secondary cell based on the received buffer status report related to D2D.

The information indicating that (transmission of) Mode 1 of the D2D is permitted in the secondary cell may be notified with an RRC message for each secondary cell as a part of configuration of the secondary cell, or may be notified as broadcast information. In a case where a plurality of secondary cells are configured, the terminal apparatus 1 may include index information indicating a secondary cell, which requests a resource of Mode 1, in the ProSe BSR or a scheduling request. Note that, the secondary cell may be a primary secondary cell.

On the other hand, in a case where the secondary cell supports Mode 1 of the D2D and the information indicating that (transmission of) Mode 1 of the D2D is permitted is not notified, the terminal apparatus 1 may perform only reception as to Mode 1 of the D2D in the secondary cell.

Moreover, when the secondary cell is brought into a deactivated state from an activated state, the terminal apparatus 1 may operate so as not to perform the transmission/reception of the D2D in the secondary cell. In addition or instead, in the case where the secondary cell is brought into the deactivated state from the activated state, as to the transmission/reception of the D2D in the secondary cell, the terminal apparatus 1 may change an operation thereof from performing both of Mode 1/Mode 2 (which may be only reception for Mode 1) to performing only Mode 2.

In addition, the terminal apparatus 1 judges a mode which is capable of (supports) the transmission/reception of the D2D in a neighboring cell (inter-frequency cell) having a frequency other than that of a serving cell (a primary cell and a secondary cell), based on the acquired information related to D2D. The terminal apparatus 1 is able to judge a supporting mode in the inter-frequency cell based on the information related to D2D.

Whether or not to perform the transmission/reception of the D2D in the inter-frequency cell is autonomously judged by the terminal apparatus 1 based on a combination of frequency bands, which allow the terminal apparatus 1 to perform the transmission/reception, and a frequency which supports the D2D. Particularly, the terminal apparatus 1 may consider that supporting Mode 2 of the D2D in the inter-frequency cell is one of the conditions.

Note that, the terminal apparatus 1 may also consider a measurement result (reception quality) of the inter-frequency cell as a condition. For example, in a case where the measurement result (RSRP, RSRQ, or the like) of the inter-frequency cell does not satisfy a cell selection criterion or a configured event trigger condition, the transmission/reception of the D2D may not be performed in the inter-frequency cell. Alternatively, in a case where at least one measurement result of the inter-frequency cell falls below a notified threshold, the transmission/reception of the D2D may not be performed in the inter-frequency cell. Otherwise, in a case where the measurement result of the inter-frequency cell exceeds a notified threshold, the transmission/reception of the D2D may be performed in the inter-frequency cell.

In addition or instead, the terminal apparatus 1 may consider a measurement result of the serving cell as a condition. For example, in a case where the measurement result of the primary cell and/or the secondary cell exceeds a notified threshold, the transmission/reception of the D2D may not be performed in the inter-frequency cell. Alternatively, in a case where the primary cell and/or the secondary cell fall below a notified threshold, the transmission/reception of the D2D may be performed in the inter-frequency cell. In addition, a timer for judging whether such conditions have been satisfied continuously for a fixed time may be further used.

In addition or instead, the terminal apparatus 1 may consider a state of the secondary cell. For example, the transmission/reception of the D2D may be performed in the inter-frequency cell only when the secondary cell is activated or a deactivated state. Moreover, the terminal apparatus 1 may add, to the conditions, that DRX is being performed. Further, the terminal apparatus 1 may add, to the conditions, that a length of a DRX cycle is longer than a certain threshold.

In addition or instead, the terminal apparatus 1 may consider a measurement result of a D2DSS, which is detected in the inter-frequency cell, as a condition. For example, in a case where the measurement result (RSRP, RSRQ, or the like) of the D2DSS detected in the inter-frequency cell falls below a notified threshold, the transmission/reception of the D2D may not be performed in the inter-frequency cell.

A threshold or a value of the timer, which is to be used for the condition, may be notified to each cell from the base station apparatus 2 with broadcast information, or notified to each terminal apparatus 1 with an individual RRC message, or a static value may be configured in advance by a system. For example, a parameter to be used for cell selection (or cell re-selection) may be used again for the threshold or the timer, a parameter of the event trigger condition may be used again, or a new parameter may be notified for the D2D. Alternatively, different values may be configured in accordance with modes of the D2D. The terminal apparatus 1 may regard the inter-frequency cell, which satisfies the condition, to be virtually in coverage.

At this time, the terminal apparatus 1 may obtain a reference timing, which is to be a reference for transmitting (receiving) SA, based on a synchronization timing (DL timing) of a signal (for example, a synchronization signal) of a frequency of a downlink subframe which corresponds to (links with) a frequency of an uplink transmission subframe, with which the transmission/reception of the D2D is performed. Moreover, the terminal apparatus 1 may obtain a timing, at which transmission data related to D2D is received (that is, a reception timing of a PUSCH (or a D2D dedicated physical channel)) with a frequency of an uplink transmission subframe, based on a reference timing of the SA and timing adjustment information related to D2D (D2D-TA).

The D2D-TA may be configured for each received SA. In this case, based on the reference timing of the received SA and the D2D-TA, the terminal apparatus 1 receives each corresponding transmission data related to D2D. Moreover, the D2D-TA may be applied only in a case where D2D of Mode 1 is received. In addition, the D2D-TA may be the same as TA.

When transmitting the transmission data related to D2D, the terminal apparatus 1 may obtain a transmission timing of a PUSCH (or a D2D dedicated physical channel) based on the reference timing of the SA and the D2D-TA. Moreover, the terminal apparatus 1 may perform transmission by including information indicating the D2D-TA in the SA. Further, the D2D-TA may be applied only in a case where D2D of Mode 1 is transmitted. Furthermore, the D2D-TA may be the same as TA.

In a case where an RF capability of the terminal apparatus 1 supports D2D, in a period of an uplink of the inter-frequency cell, in which a resource pool of D2D is configured with broadcast information, the terminal apparatus 1 may receive and/or transmit the SA in an SA resource pool and receive and/or transmit data related to D2D in a D2D data resource pool, based on each of the obtained reception timings. Note that, the transmission/reception of the D2D is not limited to mean that the terminal apparatus 1 always performs both operations of the transmission and the reception, and the terminal apparatus 1 may perform only reception processing related to D2D in the case of being interested to perform only the reception of the D2D communication, and may perform only transmission processing related to D2D in the case of being interested to perform only the transmission of the D2D communication.

With such a configuration, in the case of being interested to perform D2D communication, based on at least a combination of RFs (RF Capability) embedded in the terminal apparatus itself, a frequency (frequency band) of a cell supporting the D2D, and information related to D2D, which is notified with broadcast information, the terminal apparatus 1 is able to judge whether to be able to perform transmission/reception with the frequency supporting the D2D. In addition, in a case where the cell supporting the D2D is a secondary cell, the terminal apparatus 1 is able to judge, based on a measurement result of a primary cell and/or the secondary cell, whether or not to perform the transmission/reception of the D2D in the secondary cell.

In the case of performing the transmission/reception of the D2D in the secondary cell supporting the D2D, the terminal apparatus 1 is able to perform the transmission/reception of the D2D at a necessary timing based on information of a resource pool notified with the broadcast information of the secondary cell. Moreover, the base station apparatus 2 is able to allow the terminal apparatus 1 to perform the transmission/reception of the D2D in the secondary cell, by notifying information of a neighboring cell which provides services related to D2D. In addition, the base station apparatus 2 is able to allow the terminal apparatus 1 to perform the transmission/reception of the D2D in the secondary cell, by notifying information of the resource pool related to D2D.

According to the second embodiment, in the case of being interested to perform D2D communication, the terminal apparatus 1 acquires broadcast information from a secondary cell supporting the D2D, and, in the case of being able to perform transmission/reception of the D2D in an inter-frequency cell, the terminal apparatus 1 is able to perform the transmission/reception of the D2D in the secondary cell without changing a primary cell by handover or the like, so that it is possible to efficiently perform communication related to D2D. Further, in a case where the transmission/reception of the D2D is able to be performed in the secondary cell, the base station apparatus 2 is able to allow communication of the terminal apparatus 1, which is related to D2D, to be performed efficiently, by notifying, by using the broadcast information, the terminal apparatus 1 of information of a frequency supporting the D2D and information of a resource pool used for the transmission/reception of the D2D in the secondary cell.

Note that, the embodiments described above are only exemplifications, and may be realized by using various modified examples and substitution examples. For example, the uplink transmission scheme may be applied also to communication systems of both an FDD (frequency division duplex) scheme and a TDD (time division duplex) scheme. In addition, names of respective parameters and respective events, which are indicated in the embodiments, are given for convenience of description, and even when names in practical use and names of the embodiments of the invention are different, there is no influence on the gist of the invention which is claimed by the embodiments of the invention.

"Connection" used in each of the embodiments does not suggest to be limited only to a configuration in which a certain apparatus and a certain different apparatus are directly connected by using a physical line, and also includes a configuration of logical connection and a configuration of wireless connection by using wireless technologies.

Moreover, since transmission data related to D2D is received by using an uplink frequency in the terminal apparatus 1, when expression of "downlink" is used in each of the embodiments, it should be interpreted, as to D2D, as "reception of transmission data related to D2D from another terminal apparatus 1 using an uplink frequency (also referred to as D2D reception or D2D-Rx)". Similarly, when expression of "uplink" is used in each of the embodiments, it should be interpreted, as to D2D, as "transmission of transmission data related to D2D to another terminal apparatus 1 using an uplink frequency (also referred to as D2D transmission or D2D-Tx)".

The terminal apparatus 1 includes apparatuses having a communication function, such as not only a portable or movable mobile station apparatus, but also stationary or unmovable electronic equipment which is installed indoors and outdoors such as, for example, AV equipment, kitchen equipment, a cleaning/washing machine, air conditioning equipment, office equipment, an automatic vending machine, other domestic equipment, measurement equipment, an in-vehicle apparatus, and further, wearable equipment which is wearable, or healthcare equipment. Further, the terminal apparatus 1 is used not only for person to person or person to equipment communication, but also for equipment to equipment communication (Machine Type Communication (MTC)).

The terminal apparatus 1 is also referred to as a user terminal, a mobile station apparatus, a communication terminal, a moving body, a terminal, UE (User Equipment), or an MS (Mobile Station). The base station apparatus 2 is also referred to as a radio base station apparatus, a base station, a radio base station, a fixed station, NB (NodeB), eNB (evolved NodeB), a BTS (Base Transceiver Station), or a BS (Base Station).

Note that, the base station apparatus 2 is referred to as NB in UMTS which is prescribed by 3GPP, and as eNB in the EUTRA. Note that, the terminal apparatus 1 in the UMTS, which is prescribed by 3GPP, and the EUTRA is referred to as UE.

Further, though steps of a method, means or algorithm for realizing functions or a part of functions of each unit of the terminal apparatus 1 and the base station apparatus 2 have been described specifically in combination by using functional block diagrams for convenience of description, they may be embodied directly in hardware, in a software module executed by a processor, or in a combination thereof.

If being implemented in hardware, the terminal apparatus 1 and the base station apparatus 2 may be configured by a feeding apparatus or a battery for supplying power to the terminal apparatus 1 and the base station apparatus 2, a display apparatus of a liquid crystal or the like and a display drive apparatus, a memory, an input/output interface and an input/output terminal, a speaker, or other peripheral apparatuses, in addition to the described configuration of the block diagram.

If being implemented in software, the function may be held or transmitted as one or more commands or codes on a computer readable medium. The computer readable media include both communication media and computer recording media including a medium that facilitates transferring a computer program from one place to another place.

Then, control of the terminal apparatus 1 and the base station apparatus 2 may be performed by recording one or more commands or codes in a computer readable recording medium and causing a computer system to read the one or more commands or codes recorded in this recording medium for execution. Note that, the "computer system" here is set to include an OS and hardware such as peripheral equipment.

Operations described in each of the embodiments of the invention may be realized by a program. The program which is operated at the terminal apparatus 1 and the base station apparatus 2 related to each of the embodiments of the invention is a program which controls a CPU or the like so as to realize the functions of the aforementioned embodiments related to each of the embodiments of the invention (program causing a computer to function). In addition, information handled in these apparatuses is temporarily accumulated in a RAM during processing thereof, and then stored in various ROMs or HDDs to be read out by the CPU as necessary, for correction and writing.

In addition, although the functions of the embodiments described above are realized by executing the program, the functions of each of the embodiments of the invention are also realized in some cases by performing processing based on instructions of the program in conjunction with an operating system, other application programs, or the like.

Moreover, the "computer readable recording medium" refers to a portable medium such as a semiconductor medium (for example, such as a RAM or a nonvolatile memory card), an optical recording medium (for example, such as a DVD, an MO, an MD, a CD or a BD), a magnetic recording medium (for example, a magnetic tape or a flexible disk), or a storage apparatus including a disc unit embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

The aforementioned program may be one for realizing a part of the functions described above, and further may be one capable of realizing the functions described above by being combined with a program which has been already recorded in a computer system.

Each functional block or various features of the terminal apparatus 1 and the base station apparatus 2 used in each of the embodiments described above may be implemented or executed by a general-purpose processor, a digital signal processor (DSP), an application specific integrated circuit (ASIC) or a general application integrated circuit (IC), a field programmable gate array signal (FPGA), or other programmable logic devices, discrete gates or transistor logic, or a discrete hardware component, which is designed to exhibit at least the functions described in the present specification, or a combination thereof.

The general-purpose processor may be a microprocessor, or, alternatively, the processor may be a conventional processor, a controller, a microcontroller or a state machine. The general-purpose processor or each circuit described above may be configured by a digital circuit or may be configured by an analogue circuit, or may include the both.

The processor may be implemented also as a combination with a computing device. For example, a DSP and a microprocessor, a plurality of microprocessors, one or more microprocessors connected to a DSP core, or other such configurations may be combined.

As above, the embodiments of the invention have been described in detail based on specific examples, however, it is clear that a gist of each embodiment and a scope of Claims of the invention are not limited to these specific examples, and design change and the like which are not departed from the gist of the invention are also included. That is, the description in the present specification aims to give exemplary description and does not give any limitation to each embodiment of the invention.

The invention can be modified in various manners within the scope defined by the Claims, and embodiments obtained by appropriately combining technical means disclosed in different embodiments are also encompassed by the technical scope of the invention. A configuration in which elements described in each of the aforementioned embodiments and achieving similar effects are replaced with each other is also encompassed in the technical scope of the invention.

INDUSTRIAL APPLICABILITY

The invention is able to be used in fields of communication apparatuses including terminal apparatuses and base station apparatuses and other electronic equipment.

DESCRIPTION OF REFERENCE NUMERALS 1 terminal apparatus
2 base station apparatus 101, 201 reception unit
102, 202 demodulation unit
103, 203 decoding unit
104, 204 reception data control unit
105, 205 physical layer control unit
106, 206 transmission data control unit
107, 207 coding unit
108, 208 modulation unit
109, 209 transmission unit
110, 210 radio resource control unit
211 network signal transmission/reception unit
T01, T02 transmit antenna
R01, R02 receive antenna

The invention claimed is:

1. A first terminal device that is capable of communication with a second terminal device different from the first terminal device, the first terminal device comprising:
reception circuitry that receives first system information and second system information that are broadcast by a first cell on a non-serving frequency for Device-to-Device (D2D) communication,
the first system information including lower bound information as cell selection parameters for the first cell for the D2D communication,
the second system information indicating radio resource pools by which the first terminal device is allowed to perform D2D communication,
measurement circuitry that performs measurements on the non-serving frequency for cell selection of the first cell; and
cell selection circuitry that selects the first cell for the D2D communication in a case that a measured reception result of the first cell exceeds the lower bound information;
in a case that the cell selection circuitry selects the first cell for the D2D communication, the first cell is regarded to be in coverage, a transmission circuitry transmits, in the first cell, a data related to the D2D communication by using the radio resource pools broadcasted in the first cell, and
in a case that the measured reception result of the first cell does not exceed the lower bound information, the transmission circuitry transmits a data related to the D2D communication by using preconfigured radio resource pools of the first terminal device,
the preconfigured radio resource pools including:
i) a resource pool used both for transmission and for reception,
ii) a resource pool used for transmission, or
iii) a resource pool used for reception;
wherein the second system information in the first cell is re-acquired based on update information of the second system information related to the D2D communication, which is broadcast by the first cell, in a case where transmission/reception related to the D2D communication is performed in the first cell.

2. A base station device comprising:
transmission circuitry that transmits, to a first terminal device capable of communication with a second terminal device, first system information and second system information that are broadcast by a first cell on a non-serving frequency for Device-to-Device (D2D) communication for the first terminal device, wherein
the first system information includes lower bound information as cell selection parameters for the first cell for the D2D communication,
the second system information indicates radio resource pools by which the first terminal device is allowed to perform D2D communication,
in a case that the first terminal device selects the first cell for the D2D communication when a measured reception result of the first cell exceeds the lower bound information, the first cell is regarding to be in coverage, the radio resource pools broadcasted in the first cell are used to receive, in the first cell, a data related to the D2D communication, and
in a case that the measured reception result of the first cell does not exceed the lower bound information, preconfigured radio resource pools of the first terminal device are used to receive a data related to the D2D communication,
the preconfigured radio resource pools including:
i) a resource pool used both for transmission and for reception,
ii) a resource pool used for transmission, or
iii) a resource pool used for reception;
wherein the second system information in the first cell is re-acquired based on update information of the second system information related to the D2D communication, which is broadcast by the first cell, in a case where transmission/reception related to the D2D communication is performed in the first cell.

3. A communication system, comprising:
a first terminal device that is capable of communication with a second terminal device; and
a base station device that performs communication with the first terminal device, wherein
the base station device includes:
transmission circuitry that transmits, to the first terminal device, first system information and second system information that are broadcast by a first cell on a non-serving frequency for Device-to-Device (D2D) communication for the first terminal device, wherein
the first system information includes lower bound information as cell selection parameters for the first cell for the D2D communication,
the second system information indicates radio resource pools by which the first terminal device is allowed to perform the D2D communication;
the first terminal device includes:
reception circuitry that receives the first system information and the second system information that are broadcast by the first cell,
the first system information including cell selection parameters,
the second system information including radio resource pools by which the first terminal device is allowed to perform D2D communication, wherein a measurement result fulfills the cell selection parameters;
measurement circuitry that performs measurements on the non-serving frequency for cell selection of the first cell; and
cell selection circuitry that selects the first cell for the D2D communication in a case that a measured reception result of the first cell exceeds the lower bound information;
in a case that the cell selection circuitry selects the first cell for the D2D communication, the first cell is regarded to be in coverage, a transmission circuitry transmits, in the first cell, a data related to the D2D communication by using the radio resource pools broadcasted in the first cell, and in a case that the measured reception result of the first cell does not exceed the lower bound information, the transmission circuitry transmits a data related to the D2D communication by using preconfigured radio resource pools of the first terminal device, the preconfigured radio resource pools including:
  i) a resource pool used both for transmission and for reception,
  ii) a resource pool used for transmission, and
  iii) a resource pool used for reception;

wherein the second system information in the first cell is re-acquired based on update information of the second system information related to the D2D communication, which is broadcast by the first cell, in a case where transmission/reception related to the D2D communication is performed in the first cell.

4. A communication method of a first terminal device that is capable of communication with a second terminal, the communication method comprising:

receiving first system information and second system information that are broadcast by a first cell on a non-serving-frequency for Device-to-Device (D2D) communication,
  the first system information including lower bound information as cell selection parameters for the first cell for the D2D communication,
  the second system information indicating radio resource pools by which the first terminal device is allowed to perform D2D communication, performing measurements on the non-serving frequency for cell selection of the first cell;

selecting the first cell for the D2D communication in a case that a measured reception result of the first cell exceeds the lower bound information;

in a case that the first terminal device is selected the first cell for the D2D communication, the first cell is regarded to be in coverage, transmitting, in the first cell, a data related to the D2D communication by using the radio resource pools broadcasted in the first cell, and in a case that the measured reception result of the first cell does not exceed the lower bound information, transmitting a data related to the D2D communication by using preconfigured radio resource pools of the first terminal device, the preconfigured radio resource pools including:
  i) a resource pool used both for transmission and for reception,
  ii) a resource pool used for transmission, or
  iii) a resource pool used for reception;

wherein the second system information in the first cell is re-acquired based on update information of the second system information related to the D2D communication, which is broadcast by the first cell, in a case where transmission/reception related to the D2D communication is performed in the first cell.

5. A communication method of a base station device, comprising:

transmitting, to a first terminal device capable of communication with a second terminal device, first system information and second system information that are broadcast by a first cell on a non-serving frequency for Device-to-Device (D2D) communication for the first terminal device, wherein
  the first system information includes lower bound information as cell selection parameters for the first cell for the D2D communication on a non-serving frequency,
  the second system information indicating radio resource pools by which the first terminal device is allowed to perform D2D communication, in a case that the first terminal device selects the first cell for the D2D communication when a measured reception result of the first cell exceeds the lower bound information, the first cell is regarded to be in coverage, receiving, in the first cell, a data related to the D2D communication by using the radio resource pools broadcasted in the first cell, and in a case that the measured reception result of the first cell does not exceed the lower bound information, receiving a data related to the D2D communication by using preconfigured radio resource pools of the first terminal device, the preconfigured radio resource pools including:
  i) a resource pool used both for transmission and for reception,
  ii) a resource pool used for transmission, or
  iii) a resource pool used for receptions;

wherein the second system information in the first cell is re-acquired based on update information of the second system information related to the D2D communication, which is broadcast by the first cell, in a case where transmission/reception related to the D2D communication is performed in the first cell.

6. A first terminal device that is capable of communication with a second terminal device to execute a series of functions, the functions comprising:

receiving first system information and second system information that are broadcast by a first cell on a non-serving frequency for Device-to-Device (D2D) communication,
  the first system information including lower bound information as cell selection parameters for the first cell for the D2D communication,
  the second system information indicating radio resource pools by which the first terminal device is allowed to perform D2D communication, performing measurements on the non-serving frequency for cell selection of the first cell;

selecting the first cell for the D2D communication in a case that a measured reception result of the first cell exceeds the lower bound information;

in a case that the first terminal device selects the first cell for the D2D communication, the first cell is regarded to be in coverage, transmitting, in the first cell, a data related to the D2D communication by using the radio resource pools broadcasted in the first cell, and in a case that the measured reception result of the first cell does not exceed the lower bound information, transmitting a data related to the D2D communication by using preconfigured radio resource pools of the first terminal device, the preconfigured radio resource pools including:
  i) a resource pool used both for transmission and for reception,
  ii) a resource pool used for transmission, or
  iii) a resource pool used for reception;

wherein the second system information in the first cell is re-acquired based on update information of the second system information related to the D2D communication, which is broadcast by the first cell, in a case where transmission/reception related to the D2D communication is performed in the first cell.

7. An integrated circuit mounted in a base station device to execute a series of functions, the functions comprising:
- transmitting, to a first terminal device capable of communication with a second terminal device, first system information and second system information that are broadcast by a first cell on a non-serving frequency for Device-to-Device (D2D) communication for the first terminal device, wherein
  - the first system information includes lower bound information as cell selection parameters for the first cell for the D2D communication,
  - the second system information indicating radio resource pools by which the first terminal device is allowed to perform D2D communication;
- in a case that the first terminal device selects the first cell for the D2D communication when a measured reception result of the first cell exceeds the lower bound information, the first cell is regarded to be in coverage, transmitting, in the first cell, a data related to the D2D communication by using the radio resource pools broadcasted in the first cell, and
- in a case that the measured reception result of the first cell does not exceed the lower bound information, receiving a data related to the D2D communication by using preconfigured radio resource pools of the first terminal device,
- the preconfigured radio resource pools including:
  - i) a resource pool used both for transmission and for reception,
  - ii) a resource pool used for transmission, or
  - iii) a resource pool used for reception;
- wherein the second system information in the first cell is re-acquired based on update information of the second system information related to the D2D communication, which is broadcast by the first cell, in a case where transmission/reception related to the D2D communication is performed in the first cell.

* * * * *